(12) United States Patent
Kuroiwa

(10) Patent No.: US 9,423,012 B2
(45) Date of Patent: Aug. 23, 2016

(54) BALL SCREW DEVICE AND DUST-PROOF MEMBER EXTRACTING TOOL

(71) Applicant: NSK LTD., Shinagawa-ku, Tokyo (JP)

(72) Inventor: Daisuke Kuroiwa, Fukuoka (JP)

(73) Assignee: NSK Ltd., Tokyo (JP)

( * ) Notice: Subject to any disclaimer, the term of this patent is extended or adjusted under 35 U.S.C. 154(b) by 152 days.

(21) Appl. No.: 14/352,347

(22) PCT Filed: Oct. 19, 2012

(86) PCT No.: PCT/JP2012/006731
§ 371 (c)(1),
(2) Date: Apr. 17, 2014

(87) PCT Pub. No.: WO2013/061557
PCT Pub. Date: May 2, 2013

(65) Prior Publication Data
US 2014/0251049 A1   Sep. 11, 2014

(30) Foreign Application Priority Data

Oct. 24, 2011 (JP) ................................. 2011-233049
Mar. 29, 2012 (JP) ................................. 2012-077792
Apr. 17, 2012 (JP) ................................. 2012-093691

(51) Int. Cl.
*B25B 27/28* (2006.01)
*F16J 15/3268* (2016.01)
*F16H 25/22* (2006.01)
(Continued)

(52) U.S. Cl.
CPC ........ *F16H 25/2204* (2013.01); *B25B 27/0028* (2013.01); *B25B 27/28* (2013.01); *F16H 25/2418* (2013.01); *F16J 15/061* (2013.01);
(Continued)

(58) Field of Classification Search
None
See application file for complete search history.

(56) References Cited

U.S. PATENT DOCUMENTS 3,057,052 A   10/1962   Robertson
3,611,540 A   10/1971   Gibu
(Continued)

FOREIGN PATENT DOCUMENTS

DE   857 330           11/1952
DE   29 28 717 A1      1/1981
(Continued)

OTHER PUBLICATIONS

Japanese Office Action dated Aug. 19, 2014, with English translation (Five (5) pages).
(Continued)

*Primary Examiner* — William Kelleher
*Assistant Examiner* — Jude Agendia
(74) *Attorney, Agent, or Firm* — Crowell & Moring LLP

(57) ABSTRACT

A ball screw device is provided in which a dust-proof member can be simply attached to a nut. The ball screw device (1) is a ball screw device (1) in which a concave portion (6) is formed in an inner circumferential end portion of a nut (4) through which a screw shaft (2) passes and the concave portion (6) is provided with a dust-proof member (5), wherein the dust-proof member (5) is formed of a cylindrical elastic member into which the screw shaft (2) is inserted and includes at least one protrusion (8) protruding in an outward diameter direction from an outer circumferential surface of the dust-proof member (5), and the concave portion (6) has a groove shape to which the dust-proof member (5) is fitted and is provided with a locking portion (7) to which the protrusion (8) is locked.

4 Claims, 24 Drawing Sheets

(51) Int. Cl.
*F16H 25/24* (2006.01)
*F16J 15/32* (2016.01)
*B25B 27/00* (2006.01)
*F16J 15/06* (2006.01)

(52) U.S. Cl.
CPC ........ *F16J 15/3268* (2013.01); *Y10T 29/53657* (2015.01); *Y10T 74/19744* (2015.01)

(56) References Cited

U.S. PATENT DOCUMENTS

| | | | | |
|---|---|---|---|---|
| 4,407,511 A | * | 10/1983 | Benton | F16H 25/2418 277/354 |
| 4,905,533 A | * | 3/1990 | Benton | F16H 25/2418 277/354 |
| 5,709,283 A | | 1/1998 | Nief | |
| 6,178,839 B1 | * | 1/2001 | Yoshida | F16H 25/2418 74/424.87 |
| 6,276,225 B1 | * | 8/2001 | Takeda | F16H 25/2418 277/354 |
| 6,450,295 B1 | * | 9/2002 | Tsukada | F16H 25/2418 184/5 |
| 6,931,955 B2 | * | 8/2005 | Yatsushiro | F16H 25/2418 277/354 |
| 7,128,199 B2 | * | 10/2006 | Yang | F16H 25/2418 198/468.9 |
| 7,278,333 B2 | * | 10/2007 | Kato | F16H 25/2204 184/5 |
| 8,893,570 B2 | * | 11/2014 | Chuo | F16H 57/0497 184/5 |
| 2006/0076214 A1 | | 4/2006 | Yang et al. | |
| 2006/0096397 A1 | * | 5/2006 | Michioka | F16H 25/2204 74/89 |
| 2009/0077783 A1 | | 3/2009 | Hume et al. | |

FOREIGN PATENT DOCUMENTS

| | | |
|---|---|---|
| GB | 2 223 282 A | 4/1990 |
| JP | 64-57452 U | 4/1989 |
| JP | 5-302656 A | 11/1993 |
| JP | 2003-97668 A | 4/2003 |
| JP | 2003-130171 A | 5/2003 |
| JP | 2010-190367 A | 9/2010 |

OTHER PUBLICATIONS

Korean Office Action dated Feb. 24, 2015, with English translation (six (6) pages).
International Search Report with English translation dated Dec. 18, 2012 (5 pages).
Japanese-language Written Opinion (PCT/ISA/237) dated Dec. 18, 2012 (3 pages).
International Preliminary Report on Patentability (PCT/IB/338 & PCT/IB/373), including Translation of previously filed document C2 Written Opinion (PCT/ISA/237) dated Dec. 18, 2012 (six (6) pages).
Taiwanese Office Action issued in counterpart Taiwanese Application No. 101139253 dated Jul. 28, 2015, with English translation (Seven (7) pages).
European Search Report issued in European Application No. 12844068.2 dated Jan. 28, 2016, (ten (10) pages).

* cited by examiner

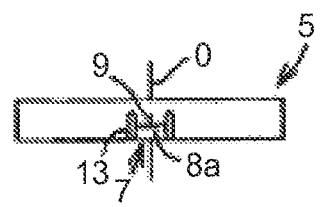
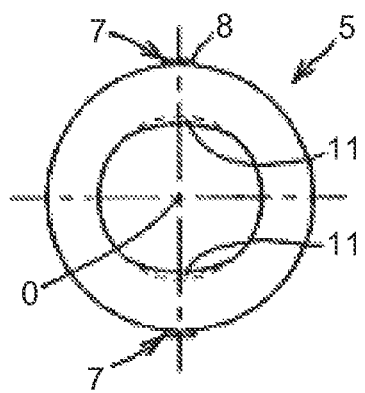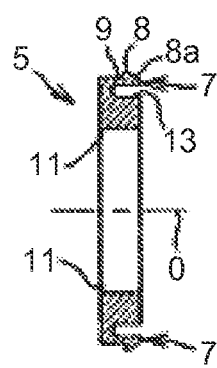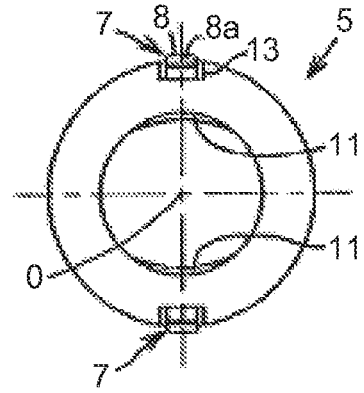
FIG. 2A  FIG. 2B  FIG. 2D

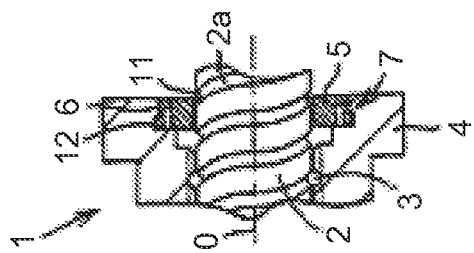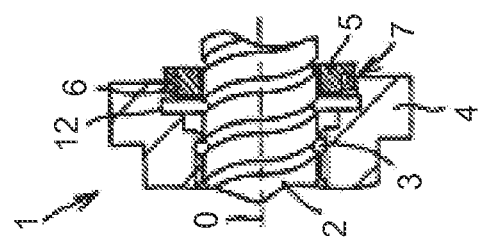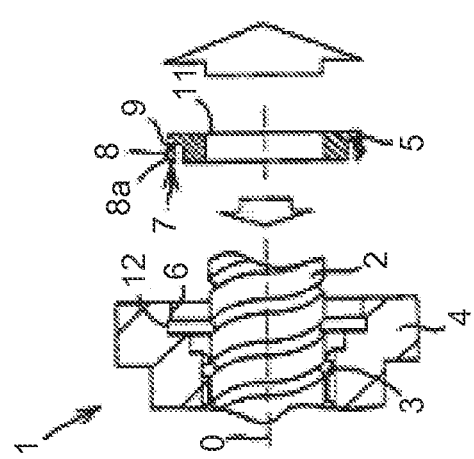

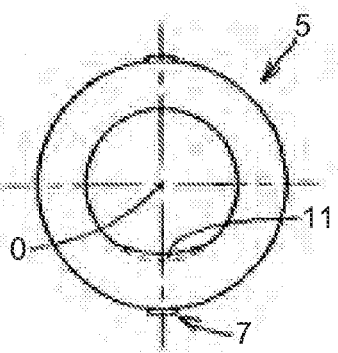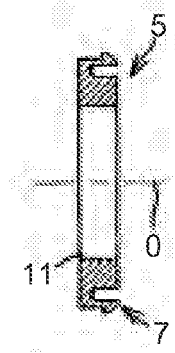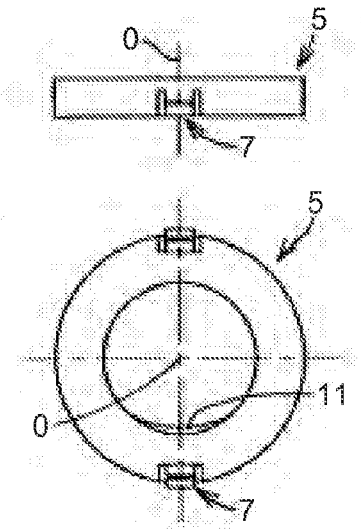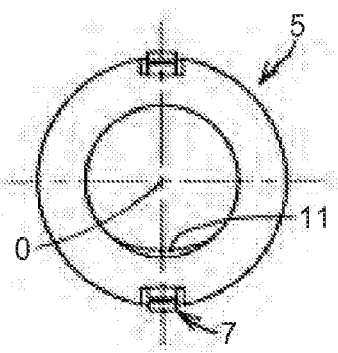
FIG. 4A  FIG. 4B  FIG. 4C  FIG. 4D
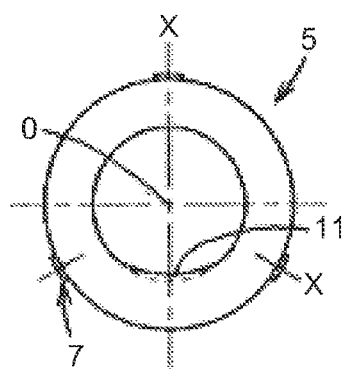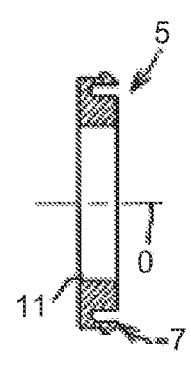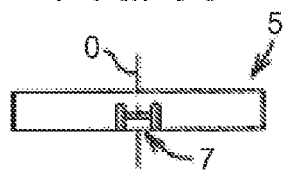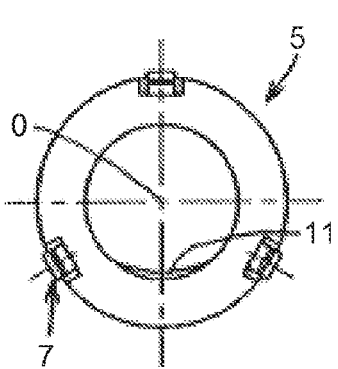
FIG. 5A  FIG. 5B  FIG. 5C  FIG. 5D

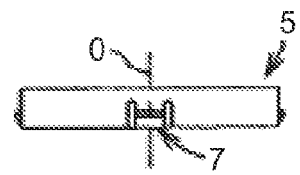
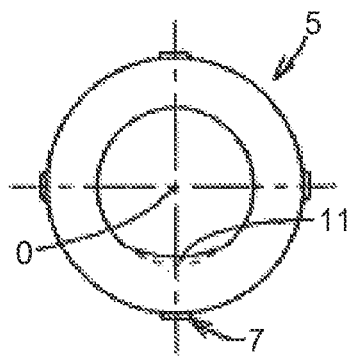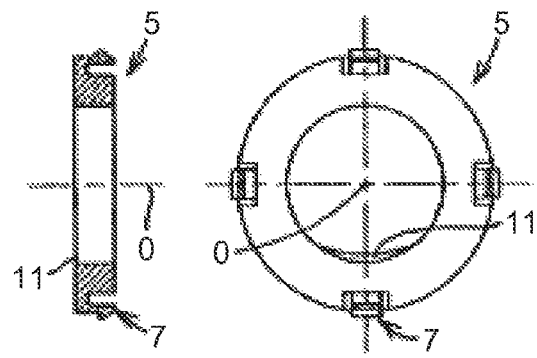
FIG. 6A    FIG. 6B    FIG. 6D
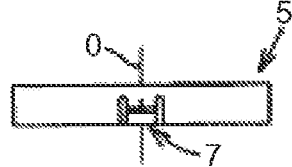
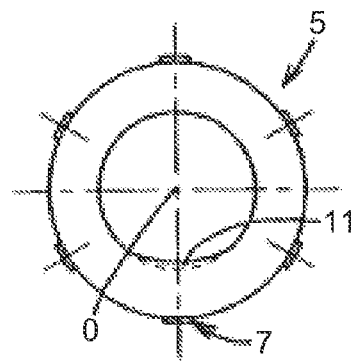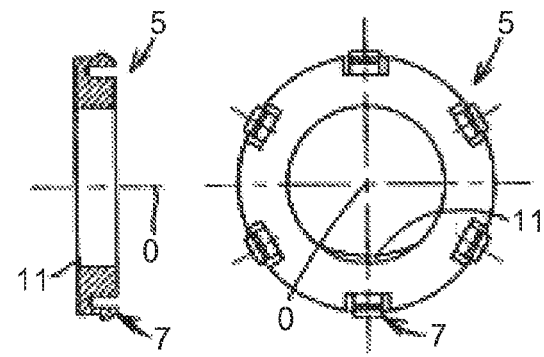
FIG. 7A    FIG. 7B    FIG. 7D

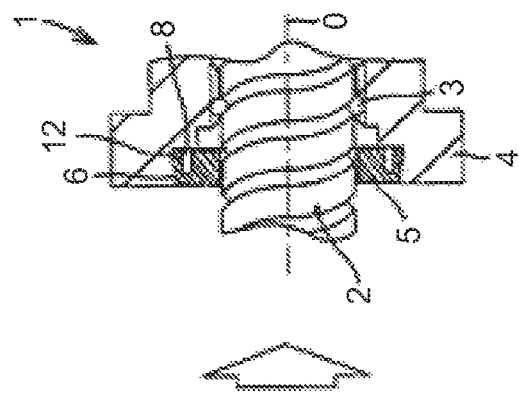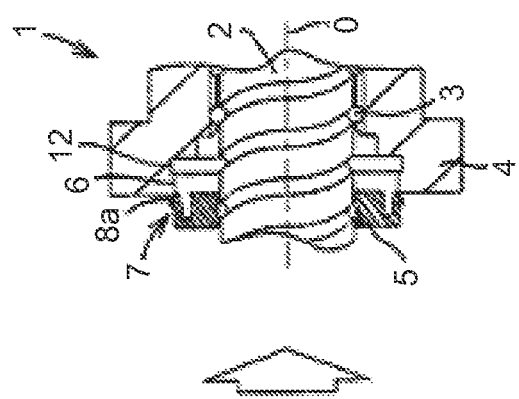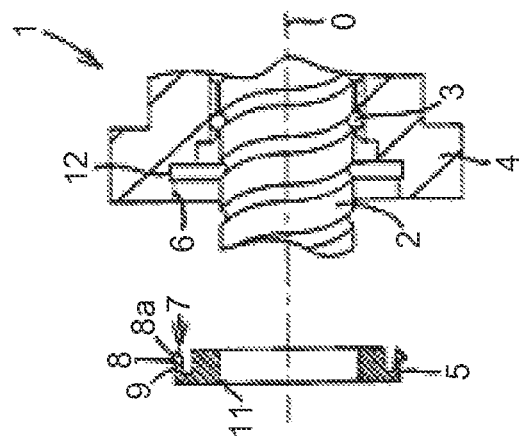

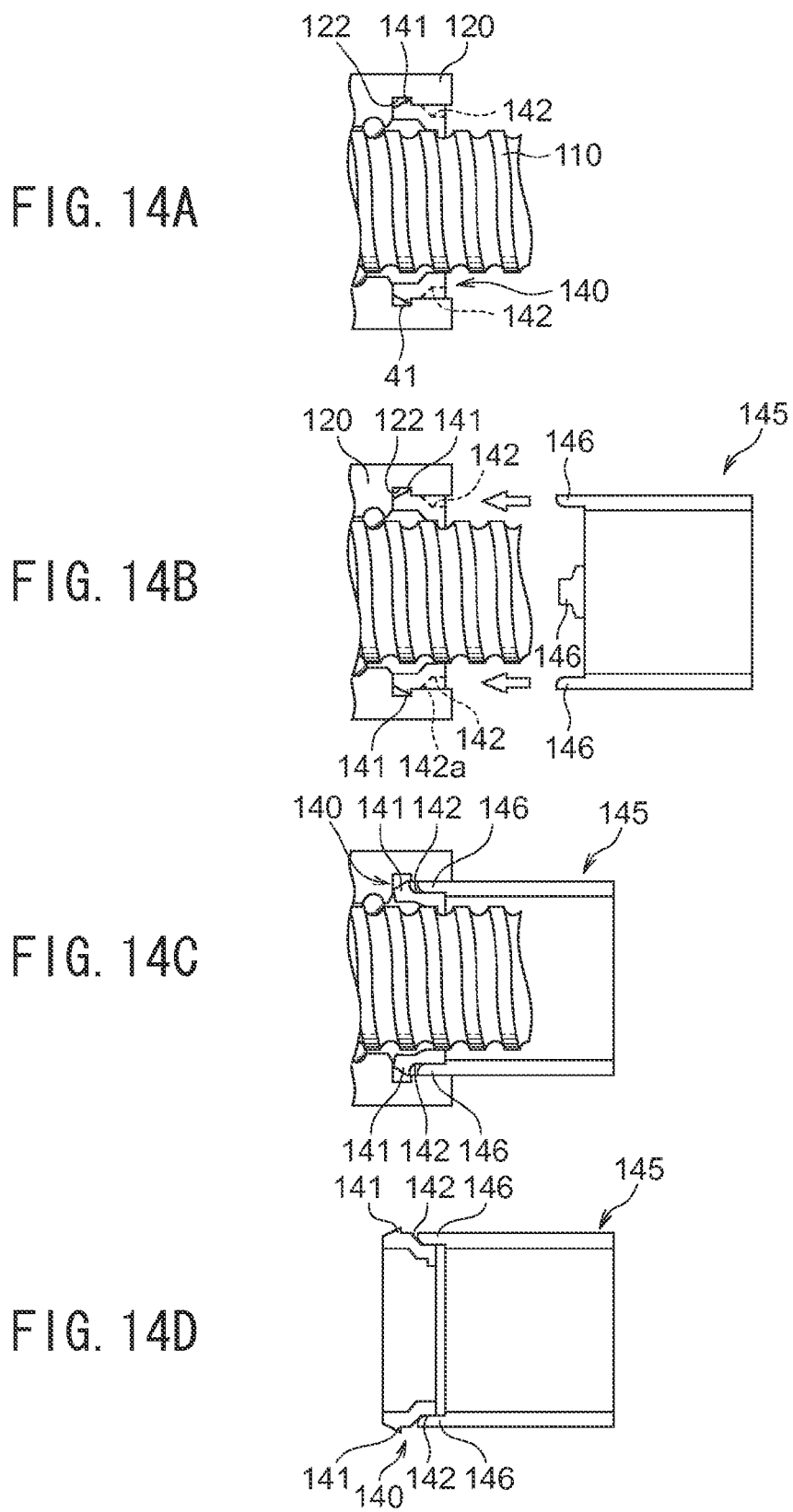

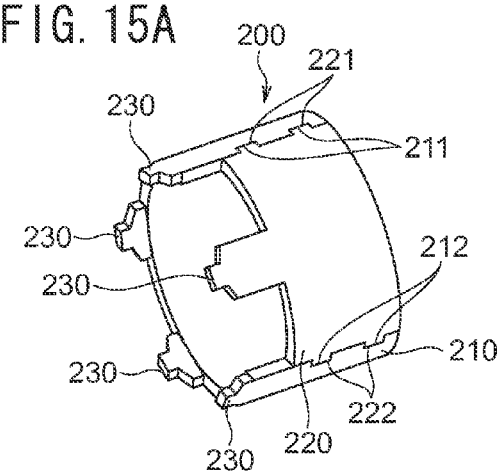
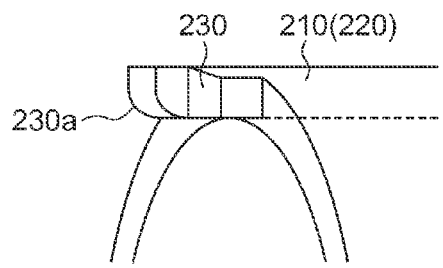
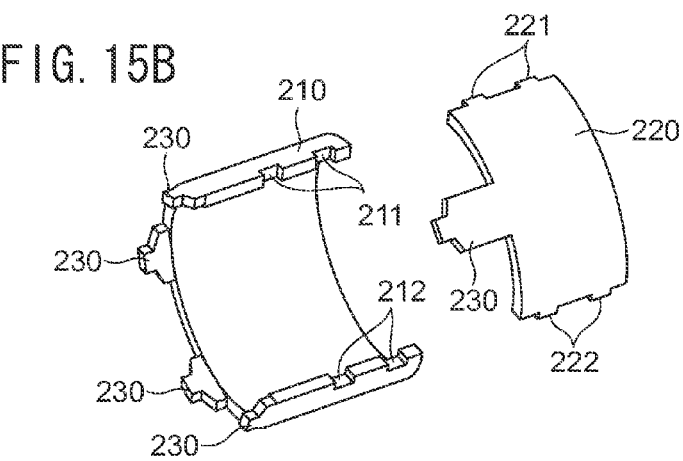
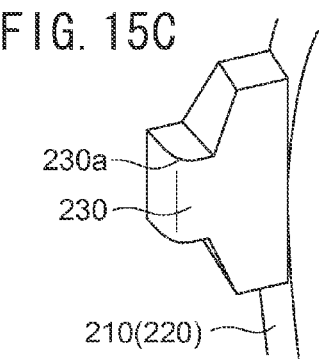
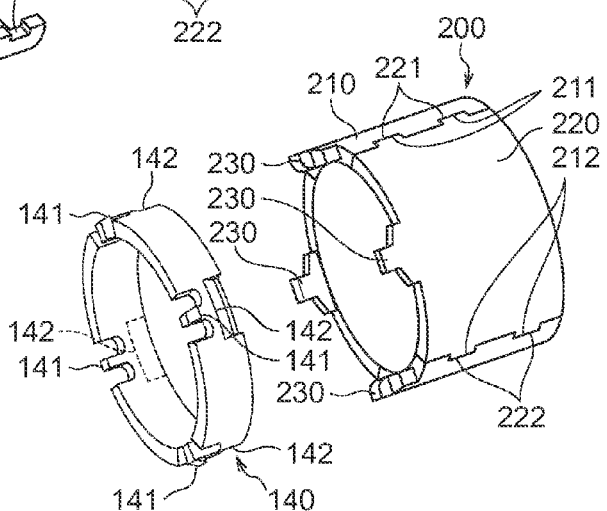

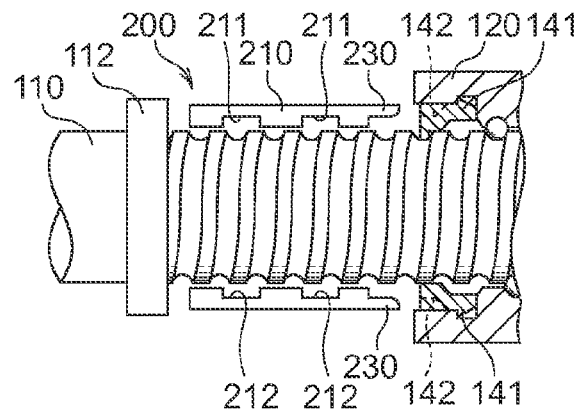
FIG. 20A
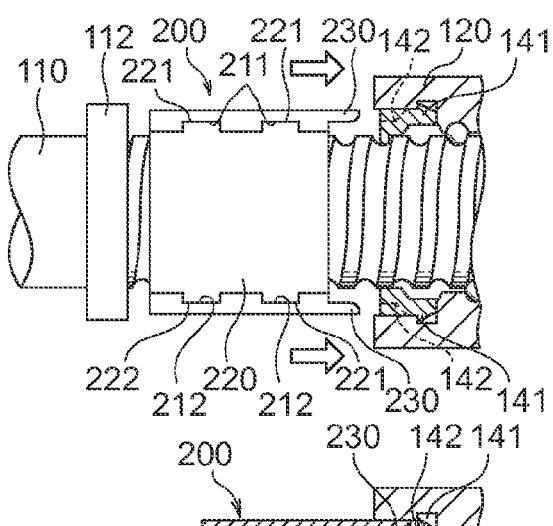
FIG. 20B
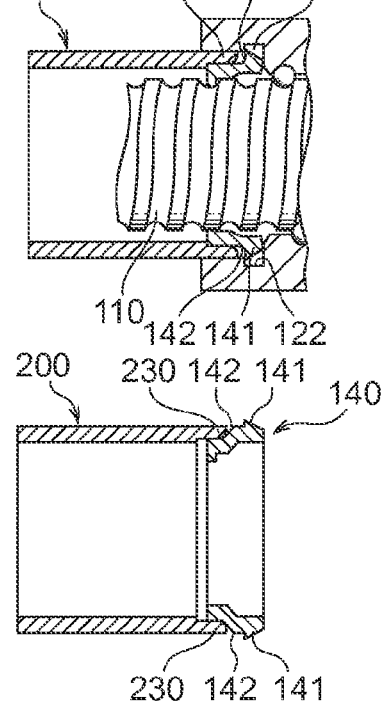
FIG. 20C
FIG. 20D

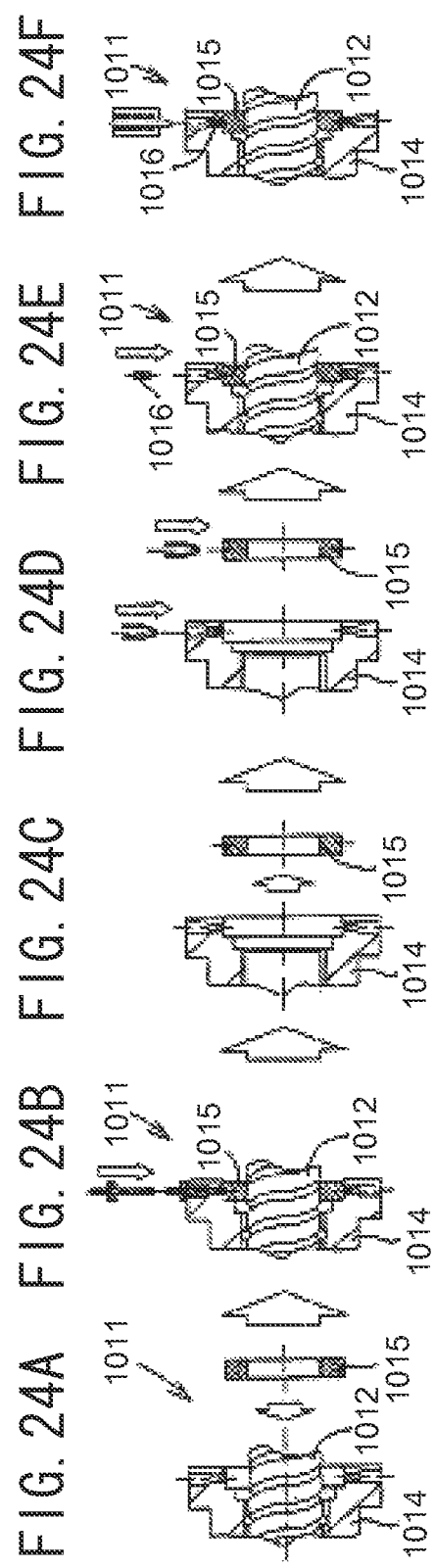

US 9,423,012 B2

BALL SCREW DEVICE AND DUST-PROOF MEMBER EXTRACTING TOOL

TECHNICAL FIELD

The present invention relates to a ball screw device used for, e.g. a steering apparatus, a heavy load carrying apparatus, a processing machine, a precise positioning apparatus, and the like and a dust-proof member extracting tool for extracting a dust-proof member disposed in the ball screw device.

BACKGROUND ART

Conventionally, a ball screw device is known which includes a dust-proof member for preventing intrusion of foreign materials such as dust, grit, and waste into a nut. As such a ball screw device, a ball screw device having a configuration in which attachment of a dust-proof member to a nut is carried out by fixing the dust-proof member with a fixing screw inserted from the outer circumference side of the nut is also known (for example, see PTL 1).

In general, a ball screw device used as a mechanical element for converting rotational movement into straight movement includes a screw shaft and a cylindrical nut disposed on the outer circumference of the screw shaft, and plural balls are combined into a space between a spiral ball rolling groove formed on the outer circumferential surface of the screw shaft and a spiral ball rolling groove formed on the inner circumferential surface of the nut.

In such a ball screw device, when foreign materials such as dust attached to the surface of the screw shaft intrudes into the nut, the smooth rolling movement of the balls is hindered and thus a dust-proof member in contact with the surface of the screw shaft is often attached to an end portion of the nut.

An example of the ball screw device including the dust-proof member is described in PTL 2. In the ball screw device, as illustrated in FIG. 25, a seal-attachment large-diameter step portion 2053 is formed on both end portions of a nut 2052 screwed to a screw shaft 2050 with balls 2051 interposed therebetween. A screw hole 2054 in the diameter direction open to the inner circumferential surface of the large-diameter step portion 2053 is formed in both end portions of the nut 2052. That is, one or two screw holes 2054 in the radius direction are formed to pass from the outer circumferential surface 2052a of the nut 2052 and a flange circumferential surface (not illustrated) to each large-diameter step portions 2053. By fitting a seal 2055 into the large-diameter step portion 2053 and fastening a fixing screw 2056 to the screw hole 2054, the seal 2055 is fixed in the circumferential direction and the axis direction.

The ball screw device used as a mechanical element for converting rotational movement into straight movement generally includes a screw shaft and a cylindrical nut disposed on the outer circumference of the screw shaft, and plural balls are combined into a space between a spiral ball rolling groove formed on the outer circumferential surface of the screw shaft and a spiral ball rolling groove formed on the inner circumferential surface of the nut.

In such a ball screw device, when foreign materials such as dust attached to the surface of the screw shaft intrudes into the nut, the smooth rolling movement of the balls is hindered and thus a dust-proof member being in contact with the surface of the screw shaft is often attached to an end portion of the nut.

In the ball screw device described in PTL 2, there is a room for improvement, since the nut 2052 is provided with the screw hole 2054, a labor required for formation of the screw hole may lower a production yield. Particularly, in forming of the screw hole 2054, when the thickness of the nut 2052 is large, a drill hole as well as a tapping hole having an internal thread formed therein needs to be formed. Thus a deviation in labor or time required for the formation is widely varied, and there was a room for improvement.

Therefore, the inventors of the present invention have invented a ball screw device in which an engagement groove is formed in the circumferential direction on the inner circumferential surface of a nut with a predetermined distance from an end in the axis direction and which includes a dust-proof member in which an engagement piece formed on the outer circumferential surface thereof to have a tubular shape is elastically deformed to engage with the engagement groove and to seal a clearance between the screw shaft and the nut.

In such a ball screw device having the above-mentioned configuration, one or more grooves are formed in the axis direction on the outer circumferential surface of the dust-proof member. Accordingly, when extracting the dust-proof member, the screw shaft is inserted into a through-hole of the dust-proof member to press the inner wall of the groove toward the central axis by the use of a protrusion of a tool to disengage the engagement piece from the engagement groove.

CITATION LIST

Patent Literatures

PTL 1: JP 5-302656 A
PTL 2: JP 2003-130171 A (FIG. 5)

SUMMARY OF INVENTION

Technical Problem

However, the above-mentioned ball screw device has a problem in that much time is required for attaching the dust-proof member to the nut. Specifically, for example, as illustrated in FIG. 24, troublesome operations needs to be performed such as assembling a ball screw device 1011 (FIG. 24A), forming a drill hole in a dust-proof member 1015 using a drill inserted from the outer circumference side of a nut 1014 (FIG. 24B), decomposing the ball screw device 1011 (FIG. 24C), ejecting air to the screw shaft 1012, the nut 1014, and the dust-proof member 1015, which have been decomposed, to remove cutting waste of the drill (FIG. 24D), assembling the ball screw device 1011 again and fixing the dust-proof member 1015 thereto using a fixing screw 1016 (FIG. 24E), and checking that the fixing screw 1016 is inserted into the drill hole of the dust-proof member 1015 by measuring the insertion depth of the fixing screw 1016 using vernier calipers (FIG. 24F).

In the ball screw device described in PTL 2, there is a room for improvement, since the nut 2052 is provided with the screw hole 2054, a labor required for formation of the screw hole may lower a production yield. Particularly, in forming of the screw hole 2054, when the thickness of the nut 2052 is large, a drill hole as well as a tapping hole having an internal thread formed therein needs to be formed. Thus, labor or time required for the formation is widely varied and there was a room for improvement.

As illustrated in FIG. 26, when a dust-proof member attached to a ball screw device in which a screw shaft 2010 is provided with a flange is extracted, the protrusion of the tool cannot reach the groove portion of the dust-proof member on the flange side due to presence of the flange. As a result, the dust-proof member may not be extracted using the tool. There is a room for improvement in the dust-proof member.

Therefore, the present invention is made in consideration of the above-mentioned problem and an object thereof is to provide a ball screw device in which a dust-proof member can be easily attached to a nut.

Another object of the present invention is to provide a ball screw device in which a dust-proof member can be easily attached to and detached from a nut regardless of the thickness of the nut.

Still another object of the present invention is to provide a dust-proof member extracting tool which can easily extract a dust-proof member attached to an end portion in the axis direction of a ball screw device including a screw shaft having a flange formed therein.

Solution to Problem

According to an aspect of the present invention for achieving the above-mentioned objects, there is provided a ball screw device in which a concave portion is formed in an inner circumferential end portion of a nut through which a screw shaft passes and the concave portion is provided with a dust-proof member, wherein the dust-proof member is formed of a cylindrical elastic member into which the screw shaft is inserted and includes at least one engagement piece protruding in an outward diameter direction from an outer circumferential surface of the dust-proof member, and wherein the concave portion has a groove shape to which the dust-proof member can be fitted and is provided with a locking portion to which the engagement piece is locked.

That is, a ball screw device according to an aspect includes a screw shaft, a nut disposed on the outer circumference of the screw shaft, and plural balls disposed between a spiral ball rolling groove formed on the outer circumferential surface of the screw shaft and a spiral ball rolling groove formed on the inner circumferential surface of the nut, where an engagement groove (the locking portion) is formed in the circumferential direction on the inner circumferential surface (the concave portion) of the nut with a predetermined distance separated from the end portion in the axis direction, and a dust-proof member which has a cylindrical shape and in which an engagement piece formed on the outer circumferential surface thereof is elastically deformed to engage with the engagement groove and to seal a clearance between the screw shaft and the nut is attached to the nut.

In the ball screw device, the outer circumferential surface of the dust-proof member may be provided with one or more groove portions in an axis direction and the engagement piece may be disengaged from the engagement groove by pressing the inner wall of the groove portion toward the central axis by the use of a protrusion of a tool.

In the ball screw device, the groove portions may be disposed at regular intervals in the circumferential direction.

In the ball screw device, the outer circumferential surface of the dust-proof member may be provided with plural convex portions in an annular shape and in fragments being in contact with the inner circumferential surface of the nut.

In the ball screw device, an end face of the dust-proof member facing the nut in an insertion direction of the dust-proof may protrude more in the insertion direction than the engagement piece protrudes.

According to another aspect of the present invention for achieving the above-mentioned objects, there is provided a dust-proof member extracting tool for extracting a dust-proof member of a ball screw device which includes a screw shaft, a nut disposed on an outer circumference of the screw shaft and having an engagement groove formed in a circumferential direction on the inner circumferential surface thereof with a predetermined distance from an end in an axis direction, a plurality of balls disposed between a spiral ball rolling groove formed on the outer circumferential surface of the screw shaft and a spiral ball rolling groove formed on the inner circumferential surface of the nut, and the dust-proof member having a cylindrical shape, having an engagement piece engaging with the engagement groove by elastic deformation formed on the outer circumferential surface thereof, being attached to the nut, and having one or more groove portions disposed in the axis direction on the outer circumferential surface, the dust-proof member extracting tool including: a first member that has an arc-like cross-sectional shape having a cutout larger than the diameter of the screw shaft and in which a plurality of protrusions for pressing the inner wall of the groove portion to the central axis to disengage the engagement piece from the engagement groove are disposed in an end portion to protrude in the axis direction; and a second member that has an arc-like cross-sectional shape and that is detachably attached to the first member in the circumferential direction to form the cylindrical shape.

In the dust-proof member extracting tool, an end portion of the second member may be provided with one or more of the protrusions for pressing the inner wall of the groove portion to the central axis to disengage the engagement piece from the engagement groove so as to protrude in the axis direction.

In the dust-proof member extracting tool, the protrusions may be disposed at regular intervals in the circumferential direction.

Advantageous Effects of Invention

According to the aspects of the present invention, it is possible to provide a ball screw device in which a dust-proof member can be easily attached to a nut.

According to the aspects of the present invention, it is possible to provide a ball screw device in which a dust-proof member can be easily attached to and detached from a nut regardless of the thickness of the nut.

According to the aspects of the present invention, it is possible to provide a dust-proof member extracting tool which can easily extract a dust-proof member attached to an end portion in the axis direction of a ball screw device including a screw shaft having a flange formed therein.

BRIEF DESCRIPTION OF DRAWINGS

FIG. 2 is a diagram illustrating a configuration of a dust-proof member in the first embodiment, where FIG. 2A is a rear view, FIG. 2B is a cross-sectional view, FIG. 2C is a top view, and FIG. 2D is a front view;

FIG. 3A-3C are diagrams illustrating a state where the dust-proof member in the first embodiment is attached to a nut;

FIG. 4 is a diagram illustrating a modification example (dust-proof member including one seal portion and two locking portions) of the dust-proof member in the first embodiment, where FIG. 4A is a rear view, FIG. 4B is a cross-sectional view, FIG. 4C is a top view, and FIG. 4D is a front view;

FIG. 5 is a diagram illustrating a modification example (dust-proof member including one seal portion and three locking portions) of the dust-proof member in the first embodiment, where FIG. 5A is a rear view, FIG. 5B is a cross-sectional view taken along line X-X of FIG. 5A, FIG. 5C is a top view, and FIG. 5D is a front view;

FIG. 6 is a diagram illustrating a modification example (dust-proof member including one seal portion and four locking portions) of the dust-proof member in the first embodiment, where FIG. 6A is a rear view, FIG. 6B is a cross-sectional view, FIG. 6C is a top view, and FIG. 6D is a front view;

FIG. 7 is a diagram illustrating a modification example (dust-proof member including one seal portion and six locking portions) of the dust-proof member in the first embodiment, where FIG. 7A is a rear view, FIG. 7B is a cross-sectional view, FIG. 7C is a top view, and FIG. 7D is a front view;

FIG. 8 is a diagram illustrating a configuration of a dust-proof member in the first and second embodiments, where

FIG. 9A-9c are diagrams illustrating a state where the dust-proof member in the second embodiment is attached to a nut;

FIG. 11 is a diagram illustrating the configuration of the dust-proof member of the ball screw device according to the third embodiment, where

FIG. 12 is a diagram illustrating an attachment procedure of the dust-proof member in the ball screw device according to the third embodiment, where

FIG. 13 is a diagram illustrating a tool used to separate the dust-proof member in the ball screw device according to the third embodiment, where

FIG. 14 is a diagram illustrating a detachment procedure of the dust-proof member in the ball screw device according to the third embodiment, where FIG. 14A is a cross-sectional view taken along the axis direction in a state where the dust-proof member is attached to the nut, FIG. 14B is a cross-sectional view taken along the axis direction before the tool is inserted, FIG. 14C is a cross-sectional view taken along the axis direction when the tool is inserted, and FIG. 14D is a cross-sectional view taken along the axis direction when the dust-proof member is extracted from the nut;

FIG. 15 is a diagram illustrating a configuration of an example of a dust-proof member extracting tool, where FIG. 15A is a perspective view, FIG. 15B is a perspective view when the dust-proof member extracting tool is separated into a first member and a second member, FIGS. 15C and 15D are partially-enlarged views of FIG. 15A, and FIG. 15E is a perspective view illustrating a configuration of another example of the dust-proof member extracting tool;

FIG. 17 is a diagram illustrating a configuration of a dust-proof member, where

FIG. 18 is a diagram illustrating an attachment procedure of the dust-proof member in the ball screw device, where

FIG. 19 is a diagram illustrating a detachment procedure of the dust-proof member installed on the opposite side of the flange of the screw shaft in an example of the dust-proof member extracting tool, where

FIG. 20 is a diagram illustrating a detachment procedure of the dust-proof member installed on the flange side of the screw shaft in an example of the dust-proof member extracting tool, where FIG. 20A is a right side view illustrating a state where a first member is disposed in the dust-proof member attached to the nut, FIG. 20B is a right side view illustrating a state where the dust-proof member extracting tool including a first member and a second member is disposed in the screw shaft, FIG. 20C is a cross-sectional view taken along the axis direction when the dust-proof member extracting tool is inserted into the nut, and FIG. 20D is a cross-sectional view taken along the axis direction when the dust-proof member is extracted from the nut;

FIG. 21 is a diagram illustrating configurations of a dust-proof member and a dust-proof member extracting tool in a ball screw device according to a fifth embodiment, where

FIG. 22 is a diagram illustrating a configuration of a dust-proof member in a ball screw device according to a sixth embodiment, where

FIG. 22B is a right side view of the dust-proof member, FIG. 22D is a cross-sectional view taken along the axis direction when a dust-proof member is combined into a ball screw device according to the related art;

FIG. 24A-24F are diagrams illustrating an example where the dust-proof member is attached to a nut in the ball screw device according to the related art;

DESCRIPTION OF EMBODIMENTS

Hereinafter, ball screw devices according to embodiments of the present invention will be described with reference to the accompanying drawings.

First Embodiment

Figure 1:
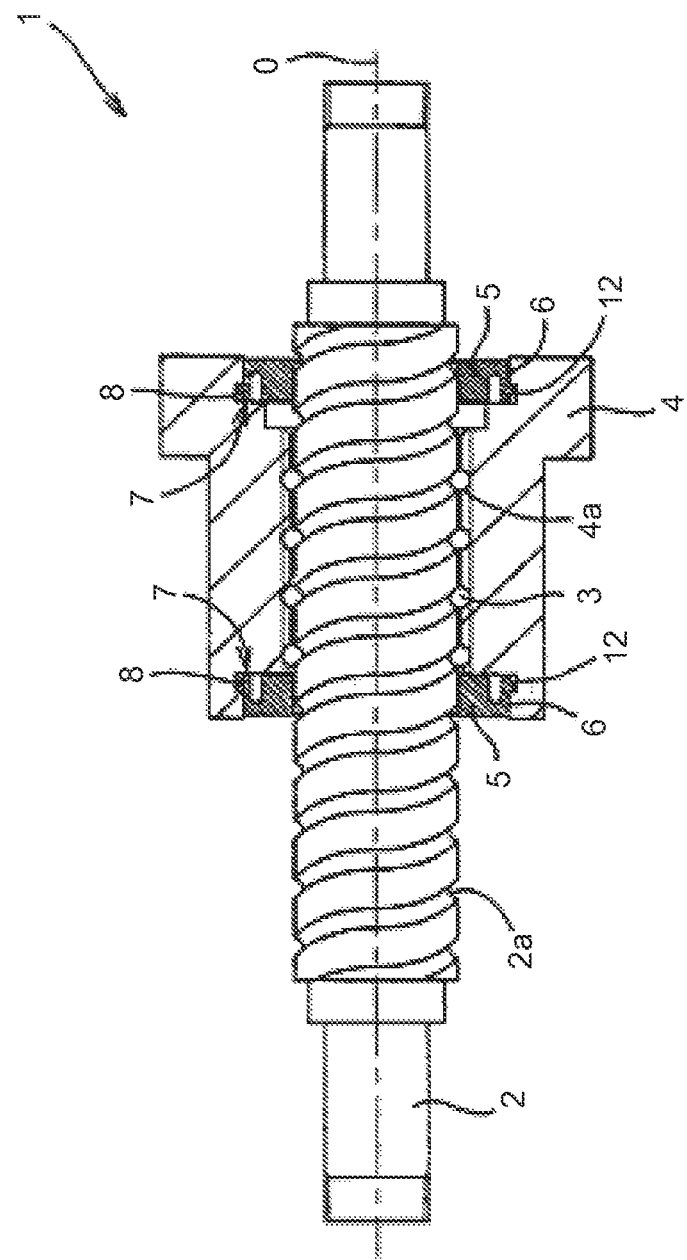
FIG. 1 is a partial cross-sectional view illustrating a configuration of a ball screw device according to first and second embodiments.

As illustrated in FIG. 1, a ball screw device 1 according to a first embodiment includes a screw shaft 2 and a nut 4 screwed to the screw shaft 2 with plural balls 3 interposed therebetween.

The screw shaft 2 is formed of a metal member having a thin and long cylinder shape. A screw groove 2a having a substantially arc-like cross-sectional surface is formed in a spiral shape on the outer circumferential surface of the screw shaft 2.

The nut 4 is formed of a substantially cylindrical metal member having a through-hole formed therein with a diameter larger than the outer diameter of the screw shaft 2. A screw groove 4a having a substantially arc-like cross-sectional surface is formed in a spiral shape on the inner circumferential surface of the nut 4 so as to correspond to the screw groove 2a of the screw shaft 2.

The screw shaft 2 is inserted into the through-hole of the nut 4 and the screw grooves 2a and 4a face each other to form a rolling path of a ball. The rolling path is filled with plural balls 3 formed of metal, whereby the screw shaft 2 and the nut 4 are screwed to each other.

According to this configuration, the plural balls 3 roll in the rolling path by rotating any one of the screw shaft 2 and the nut 4 and the other can be made to straightly move in the axis direction. The nut 4 includes a circulation component, not illustrated, forming a circulation path for circulating the ball 3 rolling and arriving at an end point of the rolling path to a start point of the rolling path. Accordingly, the plural balls 3 can circulate in the rolling path through the circulation path.

In this embodiment, two sets of screw grooves 2a are formed in the screw shaft 2 with phases different by 180 degrees. Accordingly, two sets of screw grooves 4a of the nut 4, two sets of balls 3, and two sets of circulation components not illustrated are provided to correspond thereto.

In the ball screw device 1 according to this embodiment, as illustrated in FIG. 1, a dust-proof member 5 sealing a clearance between both end portions in the axis direction of the nut 4 and the screw shaft 2 are provided to both end portions of the nut 4 so as to prevent intrusion of foreign materials such as dust, grit, and waste into the nut 4.

The dust-proof member 5 is formed of a substantially cylindrical resin member having a circular through-hole formed therein. The through-hole of the dust-proof member 5 is designed to have a diameter slightly larger than the outer diameter of the screw shaft 2 so as to prevent the dust-proof member 5 from being in contact with the screw shaft 2 when the dust-proof member 5 is attached to the nut 4. The diameter of the outer circumferential surface of the dust-proof member 5 is designed to have a size enough to fit the dust-proof member 5 into a concave portion 6 of the nut 4 to be described later.

As illustrated in FIG. 2, cutout portions 13 having a rectangular prism shape are formed in the dust-proof member 5 so as to open the outer circumference side and the front side thereof, and a locking portion 7 formed of a resin is formed in the cutout portions 13.

The locking portion 7 is formed to prevent the dust-proof member 5 attached to the nut 4 from being detached from the nut 4 and is formed as a unified body along with the dust-proof member 5. The locking portion 7 includes an engagement piece 8 protruding in the outward diameter direction at a front position on the outer circumferential surface of the dust-proof member 5 and an arm portion 9 supporting the engagement piece 8.

As illustrated in FIG. 2B, an inclined face 8a inclined to the central axis O as the hook goes to the front side (right side in FIG. 2B) from the rear side (left side in FIG. 2B) of the dust-proof member 5 is formed in the engagement piece 8. The distance between the front tip of the inclined face 8a and the central axis O is set to be smaller than the radius of the inner circumferential surface of the concave portion 6. Accordingly, when attaching the dust-proof member 5 to the nut 4, it is possible to smoothly insert the engagement piece 8 into the concave portion 6.

As illustrated in FIG. 2B, the arm portion 9 is disposed to extend in the axis direction from the bottom of the cutout portion 13 and includes the engagement piece 8 having the above-mentioned configuration at the tip thereof. Specifically, the arm portion 9 in this embodiment is formed by forming a U-shaped deep groove to surround the engagement piece 8 formed on the outer circumferential surface of the dust-proof member 5 when viewed from the front side as illustrated in FIG. 2D. Since a predetermined clearance is secured around the arm portion 9 in this way, the arm portion 9 and the engagement piece 8 can be easily elastically deformed in the diameter direction. Therefore, when attaching the dust-proof member 5 to the nut 4, it is possible to more smoothly insert the engagement piece 8 into the concave portion 6.

In this embodiment, as illustrated in FIG. 2D, the locking portion 7 having the above-mentioned configuration is disposed at two positions symmetric about the central axis O of the dust-proof member 5.

As illustrated in FIG. 2B, a seal portion 11 formed of a resin, having a thin plate shape, and extending in the inward diameter direction is formed as a unified body in an end portion on the rear side on the inner circumferential surface of the dust-proof member 5. The seal portion 11 is formed to seal a clearance between the dust-proof member 5 and the screw groove 2a of the screw shaft 2 and has a crescent shape when viewed from the front side in this embodiment as illustrated in FIG. 2D. Specifically, the seal portion 11 is designed to have such a size that the seal portion 11 does not come in contact with the screw groove 2a of the screw shaft 2 when attaching the dust-proof member 5 to the nut 4. In this embodiment, since two sets of screw grooves 2a are formed in the screw shaft 2 as described above, the seal portion 11 is also formed at two positions symmetric about the central axis O of the dust-proof member 5 to correspond thereto as illustrated in FIG. 2D.

As illustrated in FIG. 1, the concave portion 6 to which the dust-proof member 5 is attached is formed in both end portions in the axis direction of the nut 4.

In order to receive and maintain the dust-proof member 5, the concave portion 6 is formed to be coaxial with the through-hole of the nut 4 and to have a diameter larger than that of the through-hole and has a groove shape depressed from the surface of both end portions of the nut 4. An inner groove portion 12 as a locking portion receiving the engagement piece 8 of the locking portion 7 of the dust-proof member 5 and to which the engagement piece 8 is locked is formed on the bottom of the concave portion 6. The inner groove portion 12 is formed of a groove extending in the outward diameter direction on the bottom of the concave portion 6 and over the entire circumference of the concave portion 6.

By employing this configuration, the dust-proof member in this embodiment can be attached to the nut 4 using a simple attachment method as illustrated in FIG. 3.

First, an operator prepares a nut 4 into which a screw shaft 2 is inserted with plural balls 3 interposed therebetween. Then, the operator inserts the screw shaft 2 into the through-hole of the dust-proof member 5 in a state where the front face of the dust-proof member 5 is directed to the nut 4 as illustrated in FIG. 3A. Then, the operator presses the dust-proof member 5 into the concave portion 6 of the nut 4 as illustrated in FIG. 3B. At this time, the locking portion 7 of the dust-proof member 5 is elastically deformed in the inward diameter direction and is inserted into the concave portion 6 by bringing the inclined face 8a of the engagement piece 8 into contact with the edge of the concave portion 6.

Then, the operator further presses the dust-proof member 5 into the concave portion 6 as illustrated in FIG. 3C. Accordingly, the outer circumferential surface of the dust-proof member 5 is fitted to the inner circumferential surface of the concave portion 6 and the engagement piece 8 of the locking portion 7 is inserted into the inner groove portion 12. At this time, the locking portion 7 is elastically deformed in the outward diameter direction and is returned to the original shape and the engagement piece 8 is locked to the inner groove portion 12. Accordingly, it is possible to prevent the dust-proof member 5 from being detached from the concave portion 6. Finally, the operator adjusts the position of the dust-proof member 5 in the rotation direction so that the seal portion 11 of the dust-proof member 5 is appropriately inserted into the screw groove 2a of the screw shaft 2.

In this way, the attachment of the dust-proof member 5 to the nut 4 is completed and the clearance between both ends portions of the nut 4 and the screw shaft 2 is sealed with the dust-proof member 5, thereby preventing intrusion of foreign materials into the nut 4. The dust-proof member 5 in this embodiment can also prevent a lubricant supplied to the nut 4 from leaking from the nut 4.

As described above, in the ball screw device 1 according to this embodiment, an operator can simply attach the dust-proof member 5 to the nut 4. Particularly, in comparison with the above-mentioned ball screw device according to the related art, it is not necessary to perform all the troublesome operations illustrated in FIGS. 24B to 24F. Since the fixing screw is not necessary, it is possible to reduce the number of components. Accordingly, it is possible to reduce manufacturing costs.

The ball screw device 1 according to this embodiment is a so-called two-set ball screw device in which two sets of screw grooves 2a are formed in the screw shaft 2 as described above. However, the present invention is not limited to this configuration, the configuration of the dust-proof member 5 and the concave portion 6 of the nut 4 in this embodiment may be applied to a multi-set ball screw device other than two sets or a single-threaded ball screw device. When the configuration is applied to, for example, a single-threaded ball screw device, the seal portion 11 of the dust-proof member 5 has only to be formed at one position as illustrated in FIG. 4.

In the ball screw device 1 according to this embodiment, the dust-proof member 5 includes two locking portions 7 as described above. However, the number of locking portions 7 is not limited to this number, and may be one or three or more. For example, a configuration in which three locking portions 7 are formed to divide the outer circumference of the dust-proof member 5 into three parts as illustrated in FIG. 5, a configuration in which four locking portions 7 are formed to divide the outer circumference of the dust-proof member 5 into four parts as illustrated in FIG. 6, or a configuration in which six locking portions 7 are formed to divide the outer circumference of the dust-proof member 5 into six parts as illustrated in FIG. 7 may be employed. As illustrated in FIGS. 5 to 7, by employing three or more locking portions 7 of the dust-proof member 5, it is possible to more excellently prevent the dust-proof member 5 from being detached from the concave portion 6. FIGS. 5 to 7 illustrate a dust-proof member for a single-threaded ball screw device.

Second Embodiment

In a ball screw device 1 according to a second embodiment illustrated in FIG. 1, the same elements as in the first embodiment will be not described and the other elements will be described in detail.

Figure 8A:
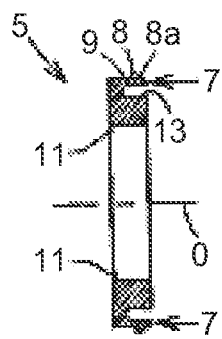
FIG. 8A is a cross-sectional view of the dust-proof member in the first embodiment.
Figure 8B:
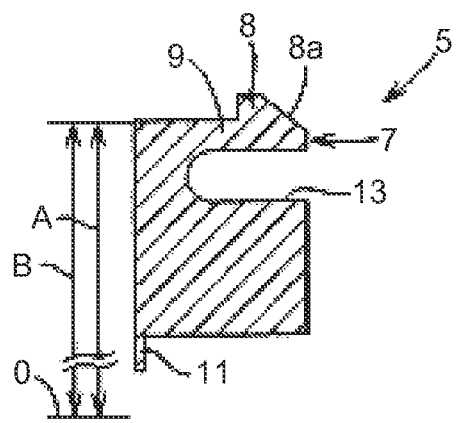
FIG. 8B is a partially-enlarged view of FIG. 8A.
Figure 8C:
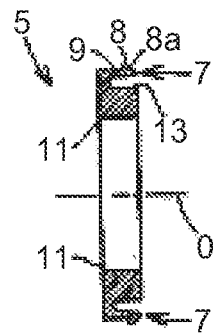
FIG. 8C is a cross-sectional view of the dust-proof member in the second embodiment.
Figure 8D:
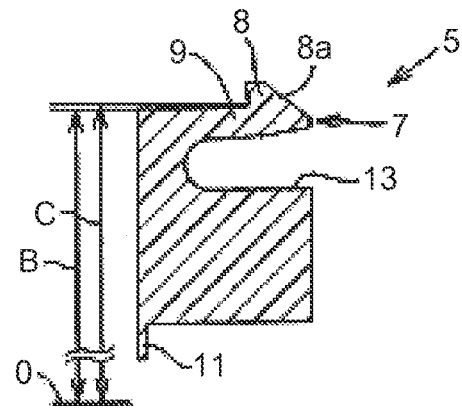
FIG. 8D is a partially-enlarged view of FIG. 8C.

In the dust-proof member 5 in this embodiment, as illustrated in FIGS. 8C and 8D, the locking portion 7 has a shape curved in the outward diameter direction. Specifically, in the dust-proof member 5 in the first embodiment, as illustrated in FIGS. 8A and 8B, the arm portion 9 is parallel to the axis direction and the distance A between the outermost surface of the arm portion 9 and the central axis O when viewed from the axis direction is equal to the radius B of the outer circumferential surface of the dust-proof member 5. On the contrary, in the dust-proof member 5 in this embodiment, the distance C between the outermost surface of the arm portion 9 and the central axis O when viewed in the axis direction is larger than the radius B of the outer circumferential surface of the dust-proof member 5.

The dust-proof member 5 having this configuration can be simply attached to the nut 4 in the same method as the attachment method described in the first embodiment (see FIG. 9).

Particularly, in this embodiment, as illustrated in FIG. 9C, when the dust-proof member 5 is fitted to the concave portion 6 and the engagement piece 18 of the locking portion 7 is inserted into the inner groove portion 12, the locking portion 7 is elastically deformed in the outward diameter direction and the engagement piece 8 is locked to the inner groove portion 12. However, the locking portion 7 curved in the outward diameter direction as described above is not returned to the original shape, but the state where the arm portion 9 is stretched in the outward diameter direction, that is, a state where the outer circumferential surface of the arm portion 9 is pressed by the inner circumferential surface of the concave portion 6, is maintained. According to this configuration, even when a force in the rotation direction is applied to the dust-proof member 5 attached to the nut 4, a large frictional force is generated between the outer circumferential surface of the arm portion 9 and the inner circumferential surface of the concave portion 6 and it is thus possible to prevent the dust-proof member 5 from rotating in the concave portion 6.

Accordingly, the ball screw device 1 according to this embodiment can exhibit the same effects as in the first embodiment. Here, when the dust-proof member 5 attached to the nut 4 rotates, the position of the seal portion 11 of the dust-proof member 5 appropriately inserted into the screw groove 2a of the screw shaft 2 is shifted. Accordingly, there is a problem in that the seal portion 11 comes in contact with the screw shaft 2 and the rotational torque of the screw shaft 2 increases greatly. On the contrary, in the ball screw device 1 according to this embodiment, since the rotation of the dust-proof member 5 can be prevented as described above, the above-mentioned problem can be prevented from occurring.

The configuration of the dust-proof member 5 and the concave portion 6 of the nut 4 in this embodiment may be applied to a multi-set ball screw device other than two sets or a single-threaded ball screw device, similarly to the first embodiment.

The number of locking portions 7 of the dust-proof member 5 in this embodiment is not limited to two, similarly to the first embodiment. By employing three or more locking portions 7 of the dust-proof member 5, it is possible to more excellently prevent the dust-proof member 5 from being detached from the concave portion 6. In addition, since the frictional force generated between the arm portion 9 of the locking portion 7 and the concave portion 6 becomes larger, it is possible to more excellently prevent the rotation of the dust-proof member 5.

The locking portion 7 of the dust-proof member 5 in this embodiment has a shape curved in the outward diameter direction as described above. However, the shape of the locking portion 7 is not limited to this shape, and is not particularly limited as long as the distance between the outermost surface of the arm portion 9 and the central axis O when viewed from the axis direction is larger than the radius of the outer circumferential surface of the dust-proof member 5. For example, by setting the arm portion 9 to a shape thick in the outward diameter direction, it is possible to prevent the rotation of the dust-proof member, similarly to this embodiment.

The ball screw device 1 according to this embodiment is a ball screw device having a so-called non-contact type dust-proof member in which the seal portion 11 of the dust-proof member 5 does not contact with the screw groove 2a of the screw shaft 2 when the dust-proof member 5 is attached to the nut 4 as described above. However, the present invention is not limited to this configuration, but the configuration of the dust-proof member 5 and the concave portion 6 of the nut 4 in this embodiment can be applied to a ball screw device having a so-called contact type dust-proof member in which the seal portion 11 comes in contact with the screw groove 2a.

According to the above-mentioned embodiments, it is possible to implement a ball screw device which a dust-proof member can be simply attached to a nut.

Third Embodiment

A ball screw device according to a third embodiment will be described below with reference to the accompanying drawings.

Figure 10:
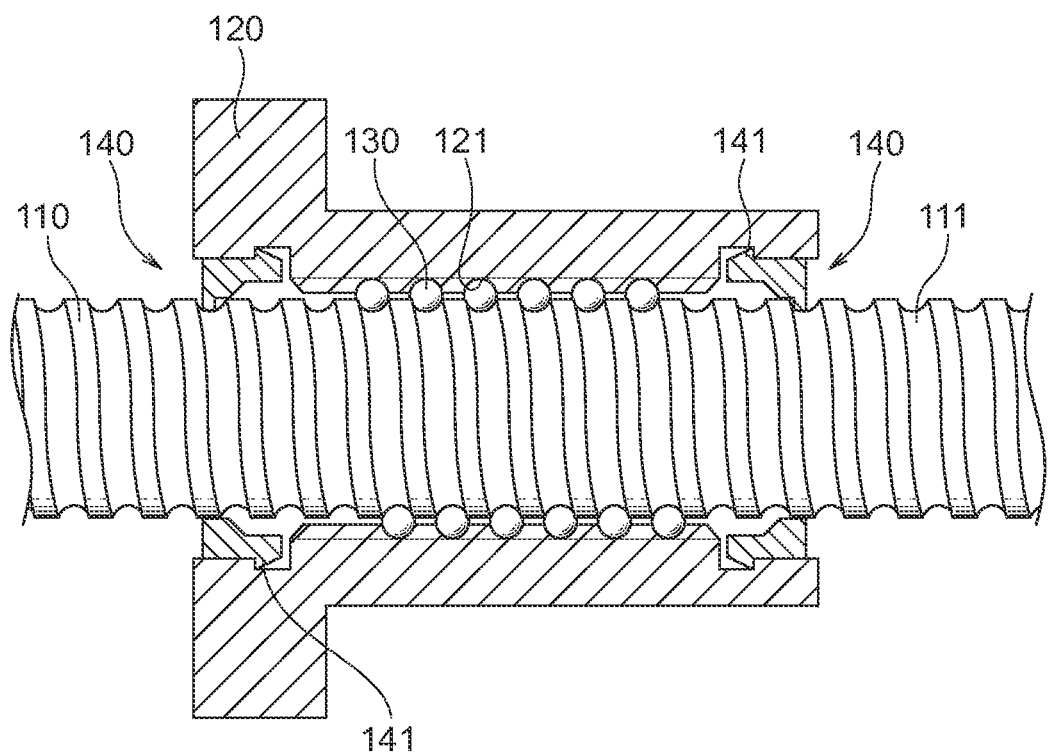
FIG. 10 is a cross-sectional view taken along an axis direction to illustrate a configuration of a ball screw device according to a third embodiment.
Figure 11A:
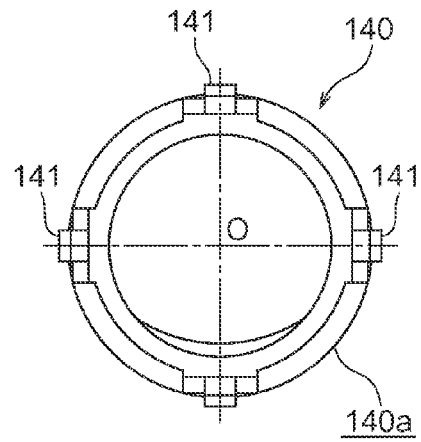
FIG. 11A is a front view.
Figure 11B:
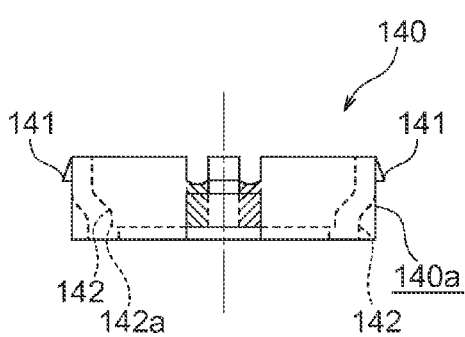
FIG. 11B is a plan view.
Figure 11C:
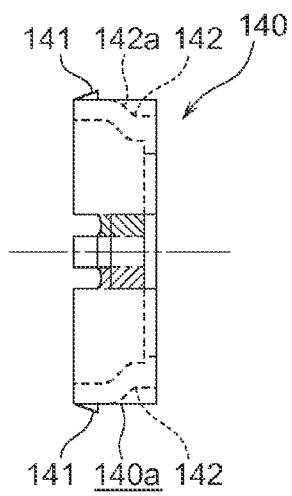
FIG. 11C is a right side view.
Figure 11D:
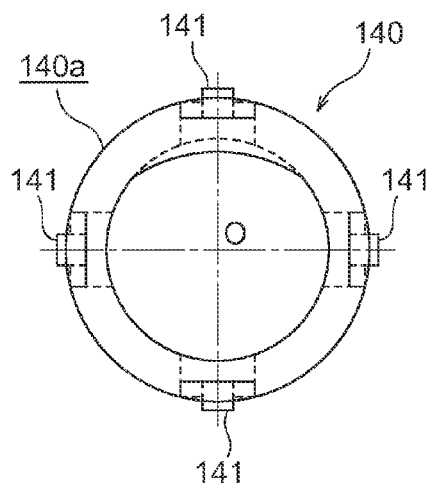
FIG. 11D is a rear view.

FIG. 10 is a cross-sectional view taken along the axis direction to illustrate a configuration of the ball screw device according to the third embodiment. FIG. 11 is a diagram illustrating the configuration of the dust-proof member of the ball screw device according to the third embodiment, where FIG. 11A is a front view, FIG. 11B is a plan view, FIG. 11C is a right side view, and FIG. 11D is a rear view.

As illustrated in FIG. 10, the ball screw device 101 according to this embodiment includes a screw shaft 110, a nut 120, and plural balls 130.

The screw shaft 110 has a spiral ball rolling groove 111 formed on the outer circumferential surface thereof, and a spiral ball rolling groove 121 is formed with the same lead as the ball rolling groove 111 on the inner circumferential surface of the nut 120 disposed on the outer circumference of the screw shaft 110.

The ball rolling grooves 111 and 121 face each other, and the plural balls 130 interposed between the ball rolling grooves 111 and 121 roll between the ball rolling grooves 111 and 121 by causing the screw shaft 110 to rotate relative to the nut 120. The balls 130 rolling between the ball rolling grooves 111 and 121 are returned to the original position through, for example, a ball return tube (not illustrated) attached to the nut 120. The space between the ball rolling grooves 111 and 121 and the ball return tube form the rolling path.

[Engagement Groove]

An annular engagement groove 122 is formed in the circumferential direction on the inner circumferential surface of the nut 120 with a predetermined distance separated from an end in the axis direction. Here, the inner circumferential surface of the nut 120 corresponds to the concave portion 6 in the first embodiment. The engagement groove 122 in this embodiment corresponds to the concave portion 6, particularly, the inner groove portion 12 in the first embodiment. The engagement groove 122 is preferably formed in each of both end portions of the nut 120, and plural engagement grooves may be formed if necessary. Here, the predetermined distance is set on the basis of the size in the axis direction of a dust-proof member 140 to be described later.

<Dust-Proof Member>

As illustrated in FIGS. 11A to 11D, the dust-proof member 140 has a tubular shape. Plural engagement pieces 141 (four in this embodiment) are disposed at regular intervals on the outer circumferential surface 140a of the dust-proof member 140. The engagement pieces 141 have elasticity and can engage with the engagement groove 122. The engagement pieces 141 are preferably formed of an elastic material as a unified body along with the dust-proof member 140. The thickness in the diameter direction of the dust-proof member 140 on the side on which the engagement piece 141 is not formed is larger than the thickness in the diameter direction of the engagement pieces 141. This is because the bending moment of the end face of the dust-proof member 140 on the side on which the engagement piece 141 is not formed is larger than the bending moment of the engagement pieces 141 when the engagement pieces 141 are elastically deformed, and thus the second moment of area of the corresponding part becomes larger.

In the dust-proof member 140, plural groove portions 142 (four in this embodiment) formed by cutting out the outer circumferential surface 140a in the axis direction to correspond to the respective engagement pieces 141 are formed on the end face opposite to the end face on the side on which the engagement piece 141 is formed.

<Attachment of Dust-Proof Member>

An attachment procedure of the dust-proof member 140 will be described below with reference to FIG. 12.

Figure 12A:
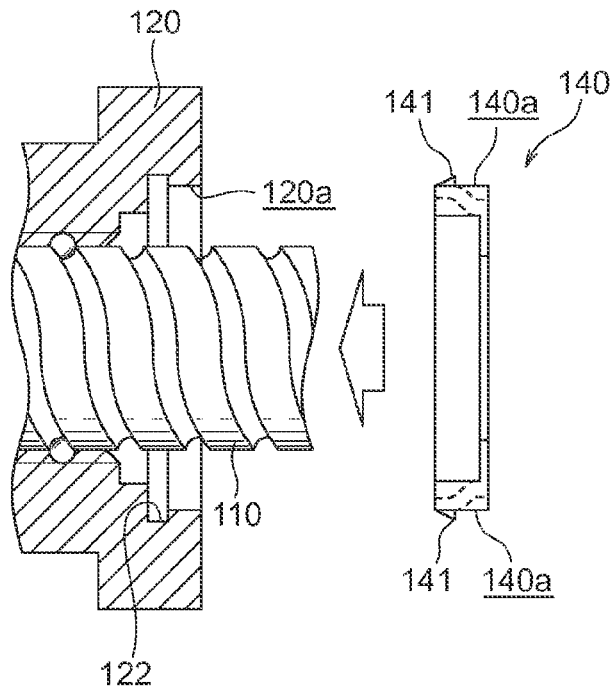
FIG. 12A is a cross-sectional view taken along the axis direction before the dust-proof member is attached to the nut and FIG. 12B is across-sectional view taken along the axis direction after the dust-proof member is attached to the nut.
Figure 12B:
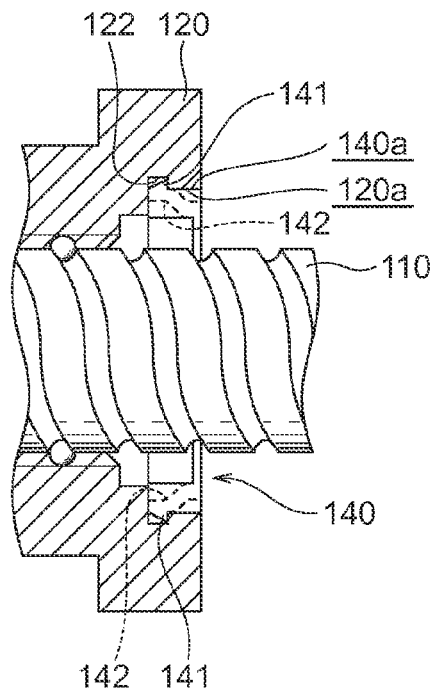

FIG. 12 is a diagram illustrating the attachment procedure of the dust-proof member in this embodiment, where FIG. 12A is a cross-sectional view taken along the axis direction before the dust-proof member is attached to the nut and FIG. 12B is a cross-sectional view taken along the axis direction after the dust-proof member is attached to the nut.

As illustrated in FIGS. 12A and 12B, the dust-proof member 140 is fitted into the nut 120 while bringing the outer circumferential surface 140a thereof into contact with the inner circumferential surface 120a of the nut 120. At this time, since the plural engagement pieces 141 are elastically deformed and fitted into the engagement groove 122, the dust-proof member 140 is fixed to the nut 120. The dust-proof member 140 attached to the nut 120 in this way seals the clearance between the screw shaft 110 and the nut 120.

<Detachment of Dust-Proof Member>

A detachment procedure of the dust-proof member will be described below with reference to FIGS. 13 and 14.

Figure 13A:
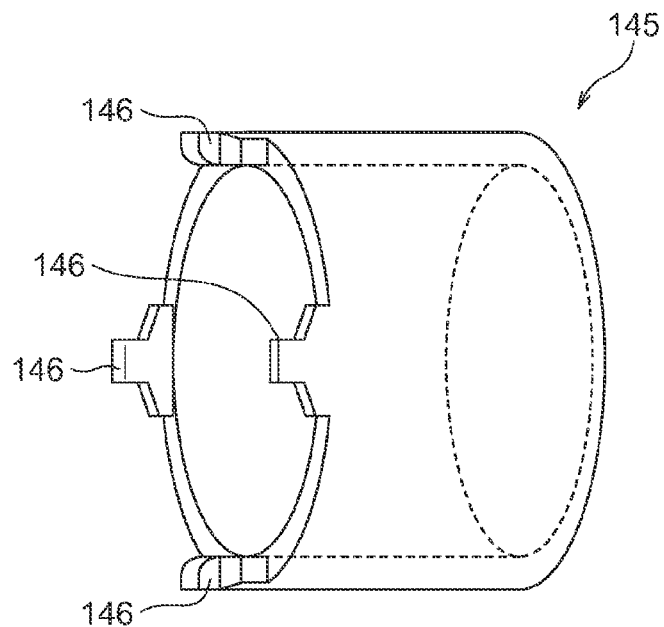
FIG. 13A is a perspective view and FIGS. 13B and 13C are partially-enlarged views of FIG. 13A.
Figure 13B:
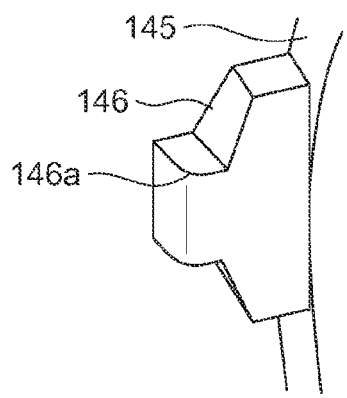
Figure 13C:
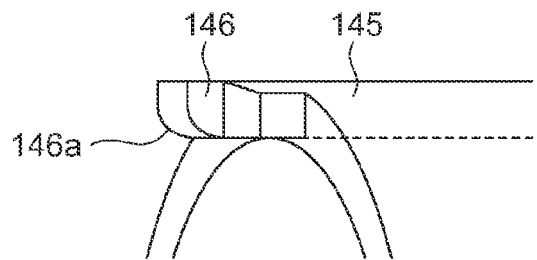

FIG. 13 is a diagram illustrating a tool used to separate the dust-proof member in this embodiment, where FIG. 13A is a perspective view and FIGS. 13B and 13C are partially-enlarged views of FIG. 13A. FIG. 14 is a diagram illustrating the detachment procedure of the dust-proof member in this embodiment, where FIG. 14A is a cross-sectional view taken along the axis direction in a state where the dust-proof member is attached to the nut, FIG. 14B is a cross-sectional view taken along the axis direction before the tool is inserted, FIG. 14C is a cross-sectional view taken along the axis direction when the tool is inserted, and FIG. 14D is a cross-sectional view taken along the axis direction when the dust-proof member is extracted from the nut.

As illustrated in FIGS. 13A to 13C, a tubular tool 145 is used to separate the dust-proof member 140 in this embodiment. The diameter of the outer circumferential surface 145a of the tool 145 is equal to the outer diameter (the diameter of the outer circumferential surface 140a) of the dust-proof member 140. On one end face of the tool 145, plural protrusions 146 are disposed to protrude in the axis direction to correspond to the positions of the groove portion 142 of the dust-proof member 140. In the tip of each protrusion 146, as illustrated in FIGS. 13B and 13C, a curved face is formed from the inside surface (surface on the central axis side of the tool 145) to the outside surface.

When the dust-proof member 140 is separated from the nut 120 using the tool 145, first, the positions of the plural protrusions 146 are aligned with the positions of the plural groove portions 142 in the dust-proof member 140 (see FIG. 14A) attached to the nut 120 (see FIG. 14B).

Then, the plural protrusions 146 are inserted between the plural groove portions 142 and the inner circumferential surface 120a of the nut 120. At this time, as the respective protrusions 146 presses the inner wall 142a of the groove portions 142 toward the central axis of the tool 145, the respective engagement pieces 141 are bent to the central axis O (see FIGS. 11A and 11D) of the dust-proof member 140 by elastic force and departs from the engagement groove 122 to release the engagement (see FIG. 14C). Here, since the curved face is formed in the tip of each protrusion 146 as described above, the engagement pieces 141 are easily disengaged from the engagement groove 122 when the protrusions 146 press the inner wall 142a of the groove portion 142 toward the central axis.

Here, the dust-proof member 140 is disposed in the nut 120 so as to engage with the ball rolling groove 111 to seal the clearance between the screw shaft 110 and the nut 120. Accordingly, when the dust-proof member 140 is rotated, for example, in the counterclockwise direction by the use of the tool 145, the dust-proof member 140 rotates along the ball rolling groove 111 and is detached from the nut 120 (see FIG. 14D).

As described above, the ball screw device 101 according to this embodiment, since the dust-proof member 140 can be attached to and detached from the nut 120 by elastic deformation, it is possible to facilitate attachment and detachment of the dust-proof member regardless of the thickness of the nut 120.

In this embodiment, the number of engagement pieces formed in the dust-proof member is four, but may be five.

Fourth Embodiment

An example of a dust-proof member extracting tool according to a fourth embodiment of the present invention will be described below with reference to the accompanying drawings. The dust-proof member extracting tool according to this embodiment is, for example, a dedicated tool used to extract a dust-proof member installed in a ball screw device described above and to be described later and is used in the same way as the tool 145 in the third embodiment.

<Dust-Proof Member Extracting Tool>

Figure 16:
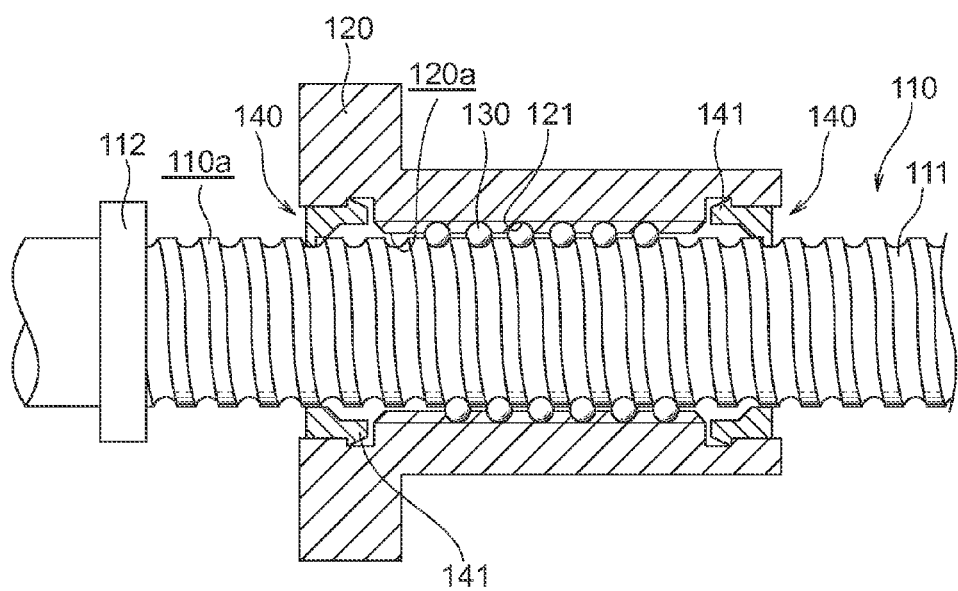
FIG. 16 is a cross-sectional view taken along the axis direction to illustrate a configuration of a ball screw device including a screw shaft having a flange.
Figure 17A:
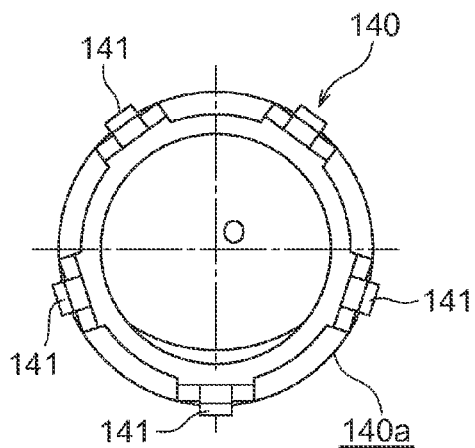
FIG. 17A is a front view.
Figure 17B:
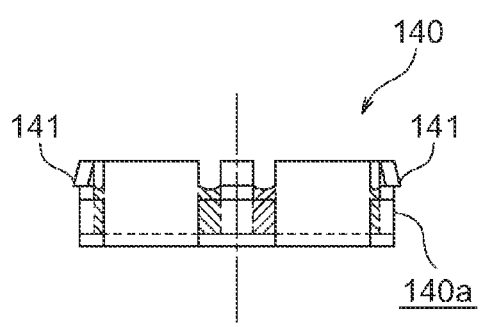
FIG. 17B is a plan view.
Figure 17C:
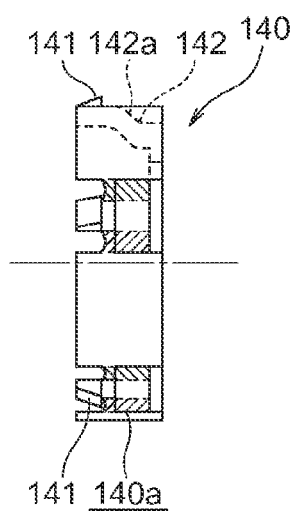
FIG. 17C is a right side view.
Figure 17D:
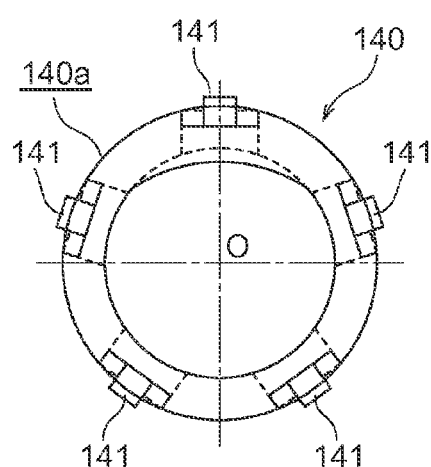
FIG. 17D is a rear view.
Figure 18A:
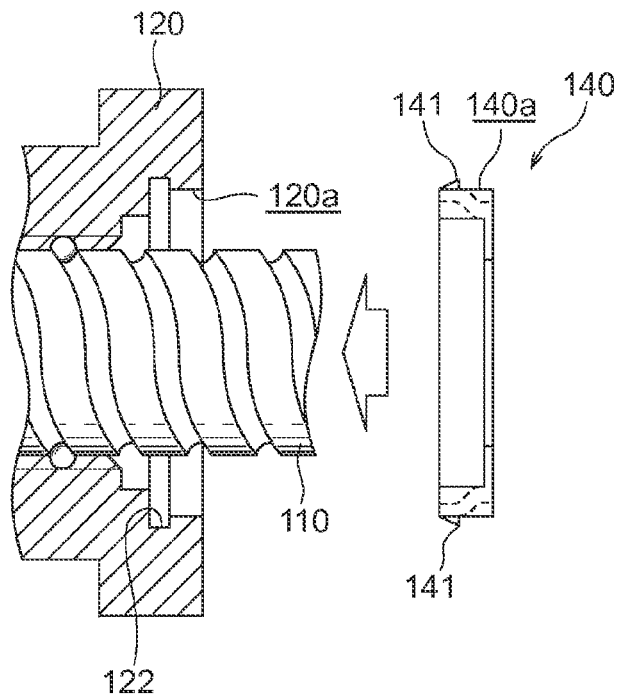
FIG. 18A is a cross-sectional view taken along the axis direction before the dust-proof member is attached to the nut and FIG. 18B is a cross-sectional view taken along the axis direction after the dust-proof member is attached to the nut.
Figure 18B:
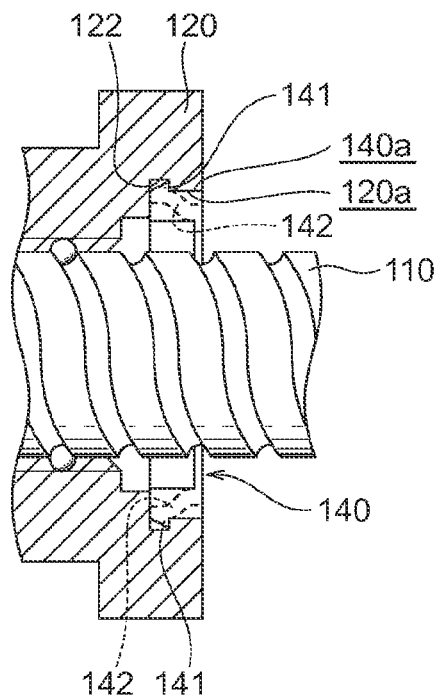
Figure 19A:
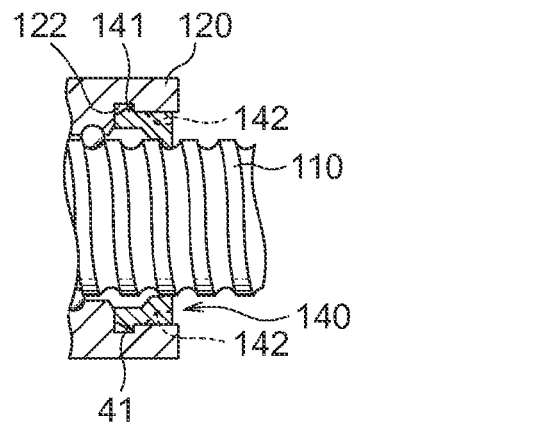
FIG. 19A is a cross-sectional view taken along the axis direction in a state where the dust-proof member is attached to the nut.
Figure 19B:
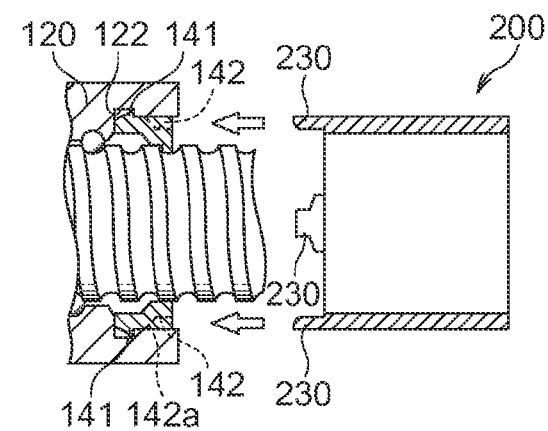
FIG. 19B is a cross-sectional view taken along the axis direction before the tool is inserted.
Figure 19C:
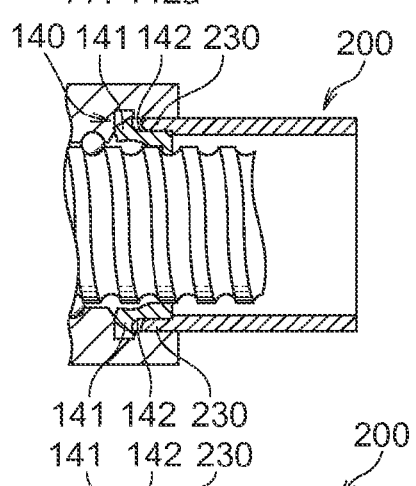
FIG. 19C is a cross-sectional view taken along the axis direction when the tool is inserted.
Figure 19D:
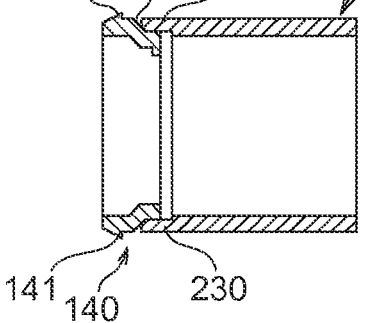
FIG. 19D is a cross-sectional view taken along the axis direction when the dust-proof member is extracted from the nut.

FIG. 15 is a diagram illustrating a configuration of an example of the dust-proof member extracting tool according to this embodiment, where FIG. 15A is a perspective view, FIG. 15B is a perspective view when the dust-proof member extracting tool is separated into a first member and a second member, FIGS. 15C and 15D are partially-enlarged views of FIG. 15A, and FIG. 15E is a perspective view illustrating a configuration of another example of the dust-proof member extracting tool. FIG. 16 is a cross-sectional view taken along the axis direction to illustrate a configuration of a ball screw device including a screw shaft having a flange. FIG. 17 is a diagram illustrating a configuration of a dust-proof member, where FIG. 17A is a front view, FIG. 17B is a plan view, FIG. 17C is a right side view, and FIG. 17D is a rear view. FIG. 18 is a diagram illustrating an attachment procedure of the dust-proof member to the ball screw device, where FIG. 18A is a cross-sectional view taken along the axis direction before the dust-proof member is attached to the nut and FIG. 18B is a cross-sectional view taken along the axis direction after the dust-proof member is attached to the nut. FIG. 19 is a diagram illustrating a detachment procedure of the dust-proof member on the side on which the flange of the screw shaft is not formed in this embodiment, where FIG. 19A is a cross-sectional view taken along the axis direction in a state where the dust-proof member is attached to the nut, FIG. 19B is a cross-sectional view taken along the axis direction before the tool is inserted, FIG. 19C is a cross-sectional view taken along the axis direction when the tool is inserted, and FIG. 19D is a cross-sectional view taken along the axis direction when the dust-proof member is extracted from the nut. FIG. 20 is a diagram illustrating a detachment procedure of the dust-proof member on the side on which the flange of the screw shaft is formed in this embodiment, where FIG. 20A is a right side view illustrating a state where a first member is disposed in the dust-proof member attached to the nut, FIG. 20B is a right side view illustrating a state where the dust-proof member extracting tool including a first member and a second member is disposed in the screw shaft, FIG. 20C is a cross-sectional view taken along the axis direction when the dust-proof member extracting tool is inserted into the nut, and FIG. 20D is a cross-sectional view taken along the axis direction when the dust-proof member is extracted from the nut.

As illustrated in FIGS. 15A to 15C, the dust-proof member extracting tool 200 according to this embodiment has a tubular shape. The diameter of the outer circumferential surface 200a of the dust-proof member extracting tool 200 is equal to the outer diameter (the diameter of the outer circumferential surface 140a) of a dust-proof member 140 to be described later.

As illustrated in FIG. 15B, the dust-proof member extracting tool 200 includes a first member 210 and a second member 220 which can be attached to and detached from. The first member 210 has an arc-like cross-sectional shape having cutouts. The size of the cutouts in the circumferential direction is set to be larger than the diameter of the screw shaft 110. Convex and concave portions 211 and 212 are formed in end portions in the circumferential direction constituting the cutout portions of the first member 210 facing each other.

The second member 220 also has an arc-like cross-sectional shape. In the second member 220, convex and concave portions 221 and 222 are formed in both end portions in the circumferential direction, and are fitted to the convex and concave portions 211 and 212 of the first member 210 and can be coupled to the first member 210. By coupling the first member 210 and the second member 220 to each other in this way, the dust-proof member extracting tool 200 having a tubular shape is formed.

Plural protrusions 230 protruding in the axis direction are formed in end faces in the axis direction of the first member 210 and the second member 220. The protrusions 230 are formed on the end face of at least the first member 210, may be formed or may not be formed on the end face of the second member 220. The plural protrusions 230 are preferably formed in at least one of the first member 210 and the second member 220 so as to be arranged at regular intervals in the circumferential direction in the end face of the dust-proof member extracting tool 200 having a tubular shape, which is formed by coupling the first member 210 and the second member 220 to each other.

The tips of the protrusions 230 have a curved face from the inside face (the surface on the central axis side of the dust-proof member extracting tool 200) to the outside face thereof as illustrated in FIGS. 15C and 15D.

As illustrated in FIG. 15E, four protrusions 230 may be arranged at regular intervals in the circumferential direction in another example of the dust-proof member extracting tool. Here, the groove portions 142 of the dust-proof member 140 are arranged at four regular intervals to correspond to the protrusions 230. The engagement pieces 141 are arranged at four regular intervals to correspond to the groove portions 142 arranged at four regular intervals.

<Configuration of Ball Screw Device>

FIG. 16 is a cross-sectional view taken along the axis direction to illustrate a configuration of a ball screw device including a dust-proof member which is extracted with the dust-proof member extracting tool according to this embodiment. FIG. 17 is a diagram illustrating a configuration of the dust-proof member which is extracted from the ball screw device with the dust-proof member extracting tool according to this embodiment, where FIG. 17A is a front view, FIG. 17B is a plan view, FIG. 17C is a right side view, and FIG. 17D is a rear view.

As illustrated in FIG. 16, the ball screw device 101 includes a screw shaft 110, a nut 120, and plural balls 130.

The screw shaft 110 has a spiral ball rolling groove 111 formed on the outer circumferential surface thereof, and a spiral ball rolling groove 121 is formed with the same lead as the ball rolling groove 111 on the inner circumferential surface of the nut 120 disposed on the outer circumference of the screw shaft 110.

The ball rolling grooves 111 and 121 face each other, and the plural balls 130 interposed between the ball rolling grooves 111 and 121 roll between the ball rolling grooves 111 and 121 by causing the screw shaft 110 to rotate relative to the nut 120. The balls 130 rolling between the ball rolling grooves 111 and 121 are returned to the original position through, for example, a ball return tube (not illustrated) attached to the nut 120. The space between the ball rolling grooves 111 and 121 and the ball return tube form the rolling path.

Here, the screw shaft 110 is provided with a flange 112.

[Engagement Groove]

An annular engagement groove 122 is formed in the circumferential direction on the inner circumferential surface of the nut 120 with a predetermined distance separated from an end in the axis direction. The engagement groove 122 is preferably formed in each of both end portions of the nut 120, and plural engagement grooves may be formed if necessary.

Here, the predetermined distance is set on the basis of the size in the axis direction of a dust-proof member 140 to be described later.

<Dust-Proof Member>

As illustrated in FIGS. 17A to 17D, the dust-proof member 140 has a tubular shape. Plural engagement pieces 141 (five in this embodiment) are disposed at regular intervals on the outer circumferential surface 140a of the dust-proof member 140. The engagement pieces 141 have elasticity and can engage with the engagement groove 122. The engagement pieces 141 are preferably formed of an elastic material as a unified body along with the dust-proof member 140. The thickness in the diameter direction of the dust-proof member 140 on the side on which the engagement piece 141 is not formed is larger than the thickness in the diameter direction of the engagement pieces 141. This is because the bending moment of the end face of the dust-proof member 140 on the side on which the engagement piece 141 is not formed is larger than the bending moment of the engagement pieces 141 when the engagement pieces 141 are elastically deformed, and thus the second moment of area of the corresponding part becomes larger.

In the dust-proof member 140, plural groove portions 142 (five in this embodiment) formed by cutting out the outer circumferential surface 140a in the axis direction to correspond to the respective engagement pieces 141 are formed on the end face opposite to the end face on the side on which the engagement piece 141 is formed. Accordingly, the number of protrusions 230 formed in the dust-proof member extracting tool 200 is equal to the number of the engagement pieces 141 and the groove portions 142.

<Attachment of Dust-Proof Member>

An attachment procedure of the dust-proof member will be described below with reference to FIG. 18.

FIG. 18 is a diagram illustrating the attachment procedure of the dust-proof member in this embodiment, where FIG. 18A is a cross-sectional view taken along the axis direction before the dust-proof member is attached to the nut and FIG. 18B is a cross-sectional view taken along the axis direction after the dust-proof member is attached to the nut. As illustrated in FIGS. 18A and 18B, the dust-proof member 140 is fitted into the nut 120 while bringing the outer circumferential surface 140a thereof into contact with the inner circumferential surface 120a of the nut 120. At this time, since the plural engagement pieces 141 are elastically deformed and fitted into the engagement groove 122, the dust-proof member 140 is fixed to the nut 120. The dust-proof member 140 installed on the side facing the flange 112 out of both end portions of the nut 120 is fitted to the screw shaft 110 before attaching the nut 120 to the screw shaft 110. That is, the dust-proof member 140 is fitted to the screw shaft 110 so as to be located between the flange 112 and the end portion of the nut 120 facing the flange 112. In this state, the nut 120 is attached to the screw shaft 110 and then the dust-proof member 140 is attached to the nut 120. The dust-proof member 140 attached to the nut 120 in this way seals the clearance between the screw shaft 110 and the nut 120.

<Extraction of Dust-Proof Member>

An extraction procedure of the dust-proof member will be described below with reference to FIGS. 15, 19, and 20.

[Extraction of Dust-Proof Member Installed on Side not Interfering with Flange]

When the dust-proof member 140 is extracted from the nut 120 using the dust-proof member extracting tool 200, first, the positions of the plural protrusions 230 are aligned with the positions of the plural groove portions 142 in the dust-proof member 140 (see FIG. 19A) attached to the nut 120 (see FIG. 19B).

Then, the plural protrusions 230 are inserted between the plural groove portions 142 and the inner circumferential surface 120a of the nut 120. At this time, as the respective protrusions 230 presses the inner wall 142a of the groove portions 142 toward the central axis of the dust-proof member extracting tool 200, the respective engagement pieces 141 are bent to the central axis O (see FIGS. 17A and 17D) of the dust-proof member 140 by elastic force and departs from the engagement groove 122 to release the engagement (see FIG. 19C). Here, since the curved face 230a is formed in the tip of each protrusion 230 as described above, the engagement pieces 141 are easily disengaged from the engagement groove 122 when the protrusions 230 press the inner wall 142a of the groove portion 142 toward the central axis.

Here, the dust-proof member 140 is disposed in the nut 120 so as to engage with the ball rolling groove 111 to seal the clearance between the screw shaft 110 and the nut 120. Accordingly, when the dust-proof member 140 is rotated, for example, in the counterclockwise direction by the use of the dust-proof member extracting tool 200, the dust-proof member 140 rotates along the ball rolling groove 111 and is detached from the nut 120 (see FIG. 19D).

[Extraction of Dust-Proof Member Installed on Side Interfering with Flange]

When the dust-proof member 140 is extracted from the nut 120 using the dust-proof member extracting tool 200, first, as illustrated in FIG. 15B), the dust-proof member extracting tool 200 is separated into the first member 210 and the second member 220. Then, as illustrated in FIG. 20A, the first member 210 is disposed so that the inner circumferential surface of the first member 210 surrounds the outer circumferential surface 110a of the screw shaft 110 on the side on which the flange 112 is formed.

Thereafter, the second member 220 is fitted to the first member 210 so that the outer circumference of the screw shaft 110 is surrounded with the dust-proof member extracting tool 200 and the screw shaft 110 passes through the through-hole of the dust-proof member extracting tool 200. The positions of the plural groove portions 142 of the dust-proof member 140 attached to the nut 120 are aligned with the positions of the plural protrusions 230 of the dust-proof member extracting tool 200 (see FIG. 20B).

Then, the plural protrusions 230 are inserted between the plural grooves 142 and the inner circumferential surface 120a of the nut 120. At this time, as the respective protrusions 230 presses the inner wall 142a of the groove portions 142 toward the central axis of the dust-proof member extracting tool 200, the respective engagement pieces 141 are bent to the central axis O (see FIGS. 17A and 17D) of the dust-proof member 140 by elastic force and departs from the engagement groove 122 to release the engagement (see FIG. 20C). Here, since the curved face is formed in the tip of each protrusion 230 as described above, the engagement pieces 141 are easily disengaged from the engagement groove 122 when the protrusions 230 press the inner wall 142a of the groove portion 142 toward the central axis.

Here, the dust-proof member 140 is disposed in the nut 120 so as to engage with the ball rolling groove 111 to seal the clearance between the screw shaft 110 and the nut 120. Accordingly, when the dust-proof member 140 is rotated, for example, in the counterclockwise direction by the use of the dust-proof member extracting tool 200, the dust-proof member 140 rotates along the ball rolling groove 111 and is detached from the nut 120 (see FIG. 20D).

As described above, since the dust-proof member extracting tool according to this embodiment includes the first member and the second member which can be attached to and detached from each other, it is possible to easily extract the dust-proof member disposed in the end portion in the axis direction of the ball screw device including the screw shaft having the flange formed therein.

The dust-proof member extracting tool according to this embodiment is not limited to the above-mentioned embodiment, but can be modified in various forms without departing from the gist of the present invention. For example, the number of protrusions of the dust-proof member extracting tool in the above-mentioned embodiment is five, but may be four or may be any number as long as the dust-proof member can be appropriately extracted. At this time, the number of grooves formed in the dust-proof member and the installation positions (installation intervals) are determined depending on the number of protrusions of the dust-proof member extracting tool and the installation positions (installation intervals) thereof, and the number of engagement pieces and the installation positions (installation intervals) thereof are preferably determined in the same way.

Fifth Embodiment

A ball screw device according to a fifth embodiment will be described below with reference to the accompanying drawings.

Figure 21A:
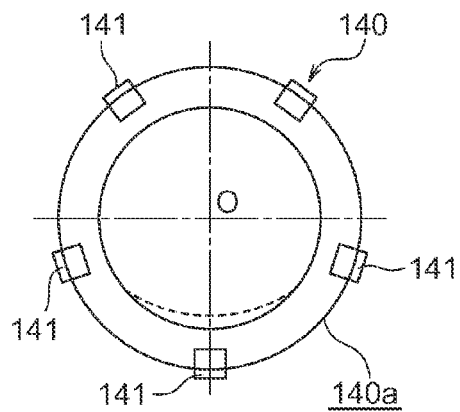
FIG. 21A is a front view of the dust-proof member.
Figure 21B:
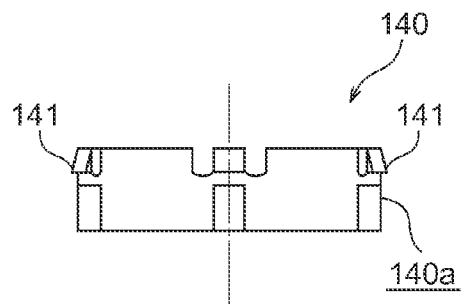
FIG. 21B is a plan view of the dust-proof member.
Figure 21C:
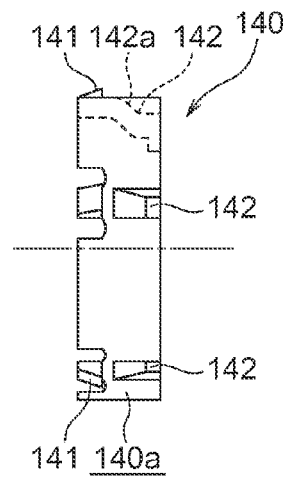
FIG. 21C is a right side view of the dust-proof member.
Figure 21D:
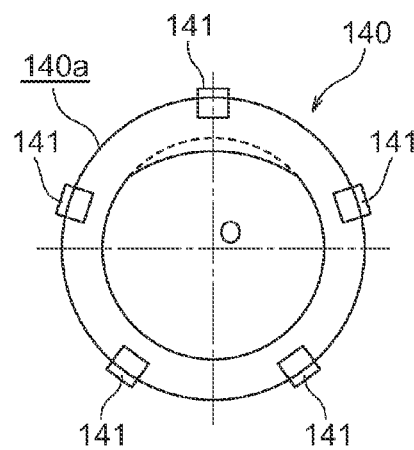
FIG. 21D is a rear view of the dust-proof member.
Figure 21E:
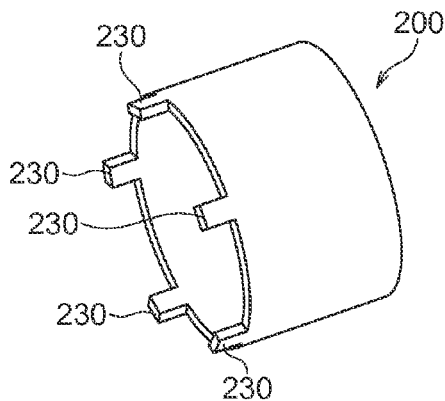
FIG. 21E is a perspective view of the dust-proof member extracting tool.
Figure 21F:
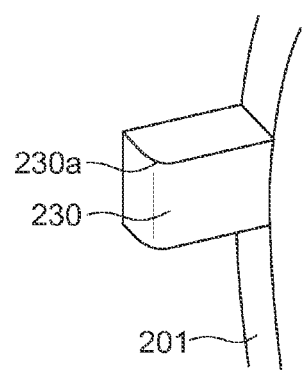
FIG. 21F is an enlarged view of an important part of FIG. 21E.

FIG. 21 is a diagram illustrating configurations of a dust-proof member and a dust-proof member extracting tool in a ball screw device according to the fifth embodiment, where FIG. 21A is a front view of the dust-proof member, FIG. 21B is a plan view of the dust-proof member, FIG. 21C is a right side view of the dust-proof member, FIG. 21D is a rear view of the dust-proof member, FIG. 21E is a perspective view of the dust-proof member extracting tool, and FIG. 21F is an enlarged view of an important part of FIG. 21E. The ball screw device according to this embodiment is different from the third embodiment in only the configuration of the dust-proof member and thus elements overlapping with or corresponding to the third embodiment will be referenced by the same reference signs and description thereof will not be repeated.

As illustrated in FIG. 21, in the ball screw device 101 according to this embodiment, the width in the circumferential direction of the groove portion 142 of the dust-proof member 140 is set to be smaller than the width in the circumferential direction of the groove portion 142 in the third embodiment. It is preferable that the width in the circumferential direction of the groove portion 142 be substantially equal to the width in the circumferential direction of the engagement piece 141.

By employing this configuration, even when a strength of a certain degree or more is required for the dust-proof member 140 or the like, it is possible to improve rigidity force of the groove portion 142. By setting the width of the groove portion 142 to be small in this way, as illustrated in FIG. 21E), the plural protrusions 230 disposed on the end face 201 of the dust-proof member extracting tool 200 can be formed in a rectangular shape. By forming the protrusions 230 of the dust-proof member extracting tool 200 in a rectangular shape, it is possible to reduce the manufacturing costs of the dust-proof member extracting tool 200 and to improve the yield of the dust-proof member extracting tool 200. Similarly to the dust-proof member extracting tool according to the above-mentioned embodiment, the tips of the protrusions 230 having a rectangular shape may be formed in a curved face 230a (see FIG. 21F).

Sixth Embodiment

A ball screw device according to a sixth embodiment will be described below with reference to the accompanying drawings.

Figure 22A:
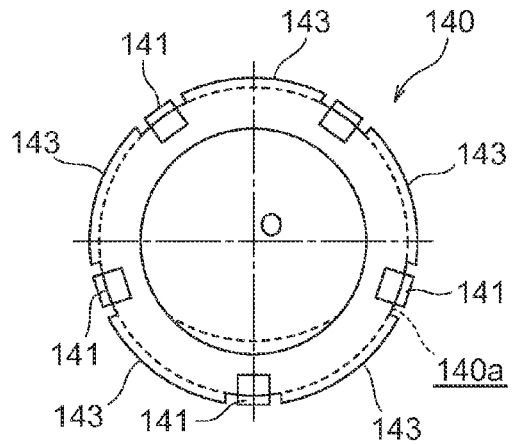
FIG. 22A is a front view of the dust-proof member.
Figure 22B:
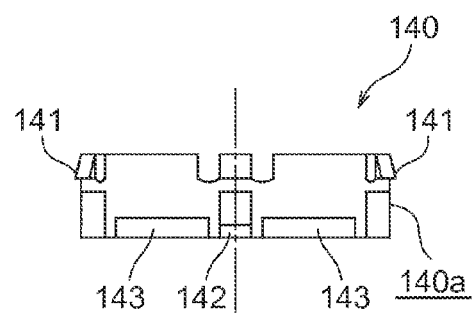
FIG. 22B is a plan view of the dust-proof member.
Figure 22C:
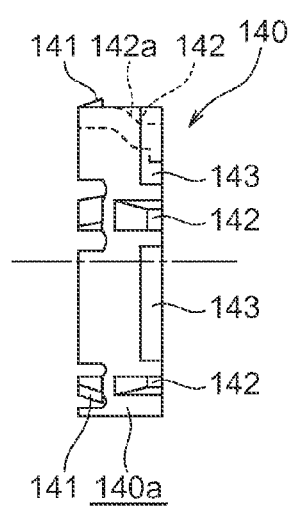
FIG. 22C is a right side view of the dust-proof member.
Figure 22D:
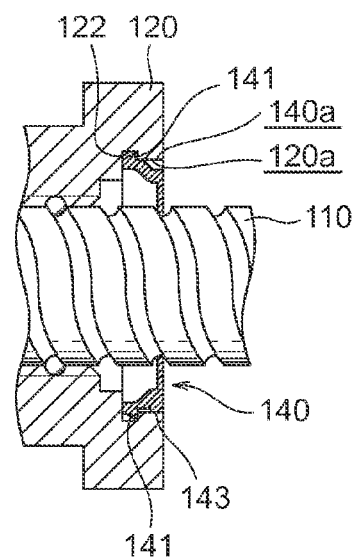
FIG. 22D is a cross-sectional view taken along the axis direction when the dust-proof member is combined into the ball screw device.
Figure 22E:
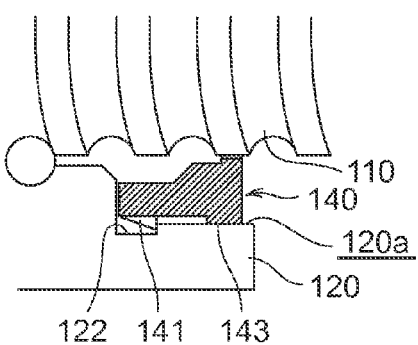
FIG. 22E is an enlarged view of an important part of FIG. 22D.

FIG. 22 is a diagram illustrating a configuration of a dust-proof member in a ball screw device according to the sixth embodiment, where FIG. 22A is a front view of the dust-proof member, FIG. 22B is a plan view of the dust-proof member, FIG. 22C is a right side view of the dust-proof member, FIG. 22D is a cross-sectional view taken along the axis direction when the dust-proof member is combined into the ball screw device, FIG. 22E is an enlarged view of an important part of FIG. 22D. The ball screw device according to this embodiment is different from the third embodiment in only the configuration of the dust-proof member and thus elements overlapping with or corresponding to the third embodiment will be referenced by the same reference signs and description thereof will not be repeated.

As illustrated in FIG. 22, in the ball screw device 101 according to this embodiment, plural convex portions 143 being in contact with the inner circumferential surface 120a of the nut 120 are formed in an annular shape and in fragments on the outer circumferential surface 140a of the dust-proof member 140.

The plural convex portions 143 may be arranged at regular intervals on the outer circumferential surface 140a of the dust-proof member 140, may be arranged at regular intervals or at irregular intervals with respect to the central axis O of the dust-proof member 140.

It is preferable that the plural convex portions 143 be arranged with an allowance of 0 mm to 0.10 mm from the inner circumferential surface 120a of the nut 120.

By arranging the plural convex portions 143 on the outer circumferential surface 140a of the dust-proof member 140 in this way, it is possible to make the dust-proof member 140 difficult to move in the circumferential direction relative to the nut 120 deformed by heat treatment.

Seventh Embodiment

A ball screw device according to a seventh embodiment will be described below with reference to the accompanying drawings.

Figure 23A:
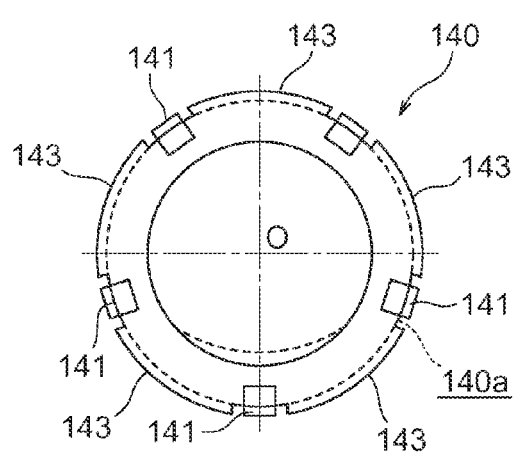
FIG. 23A is a front view of the dust-proof member.
Figure 23B:
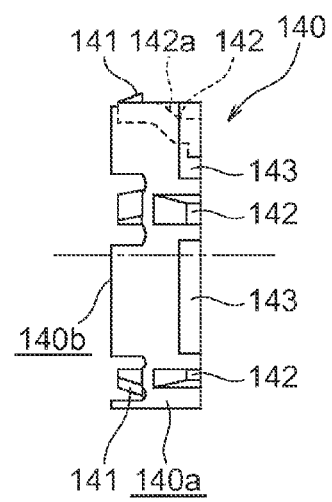
FIG. 23 is a diagram illustrating a configuration of a dust-proof member in a ball screw device according to a seventh embodiment, where
FIG. 23C is a cross-sectional view taken along the axis direction when the dust-proof member is combined into the ball screw device.

FIG. 23 is a diagram illustrating a configuration of a dust-proof member in a ball screw device according to the seventh embodiment, where FIG. 23A is a front view of the dust-proof member, FIG. 22B is a right side view of the dust-proof member, FIG. 22C is a cross-sectional view taken along the axis direction when the dust-proof member is combined into the ball screw device, and FIG. 22D is a cross-sectional view taken along the axis direction when the dust-proof member is combined into the ball screw device in the related art. The ball screw device according to this embodiment is different from the sixth embodiment in only the configuration of the dust-proof member and thus elements overlapping with or corresponding to the sixth embodiment will be referenced by the same reference signs and description thereof will not be repeated.

As illustrated in FIGS. 23A to 23D, in the ball screw device 101 according to this embodiment, an end face 140b of the dust-proof member 140 facing the direction in which the dust-proof member 140 is inserted into the nut 120 protrudes more in the insertion direction than the engagement pieces 141. That is, the end face 140b and the ends 141a of the engagement pieces 141 form a gap (step) in the insertion direction.

Figure 23C:
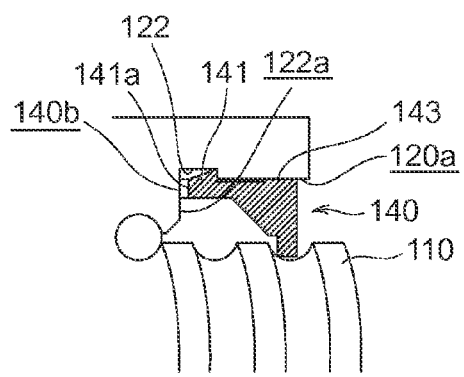
Figure 23D:
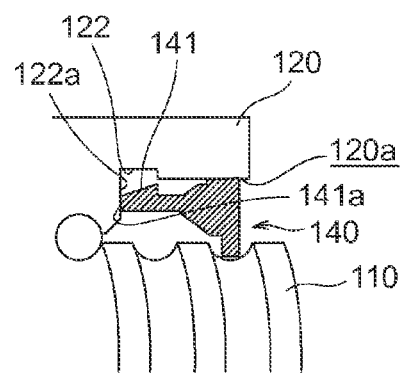
Figure 25:
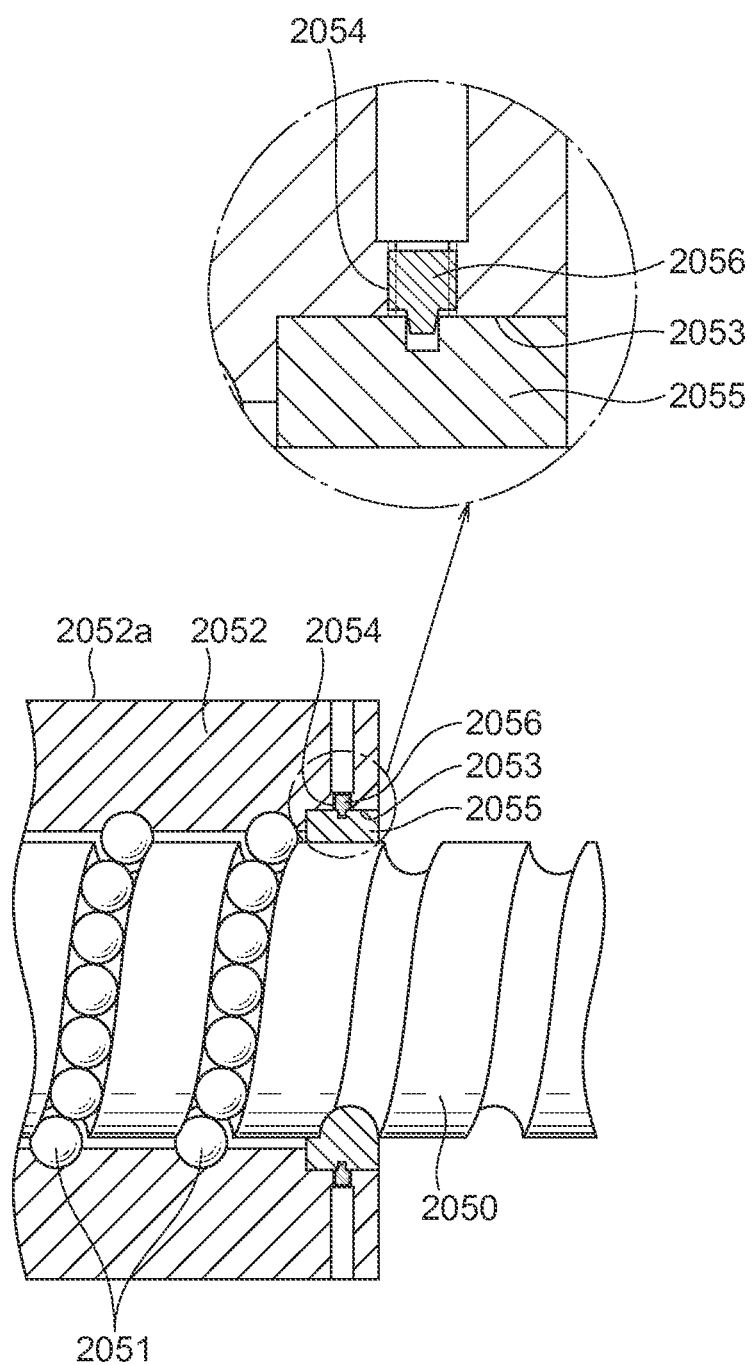
FIG. 25 is a cross-sectional view taken along the axis direction to illustrate the configuration of the ball screw device according to the related art.
Figure 26:
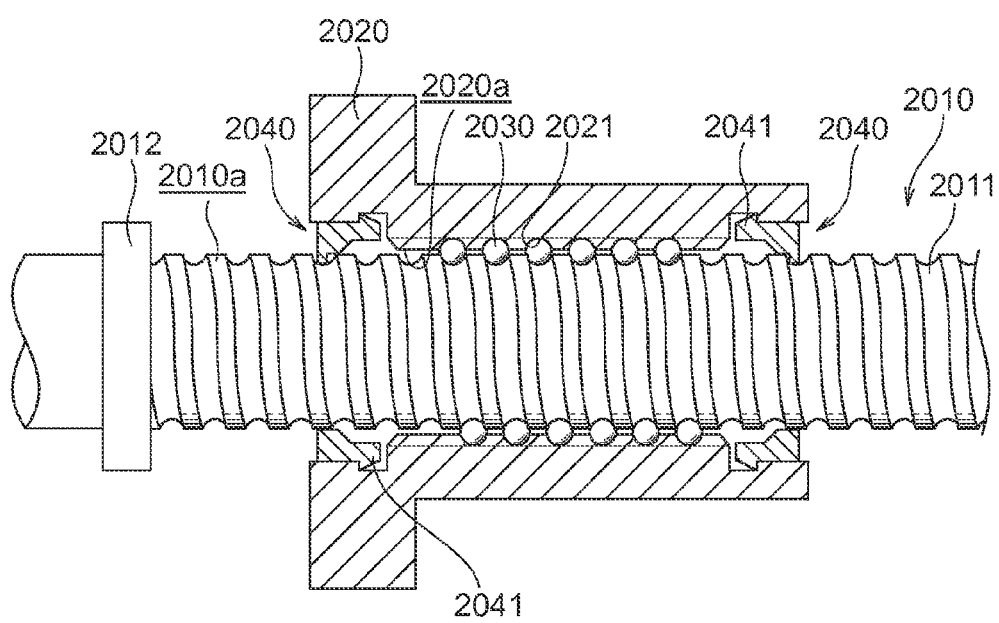
FIG. 26 is a cross-sectional view taken along the axis direction to illustrate a configuration of a ball screw device including a screw shaft having a flange according to the related art.

By employing this configuration, even when the dust-proof member 140 is fitted to the nut 120, the end face 140b comes in contact with the end faces 122a of the engagement grooves 122 facing the engagement pieces 141 earlier than the engagement pieces 141 (see FIG. 23C). Accordingly, even when the dust-proof member 140 is strongly inserted into the nut 120, as illustrated in FIG. 23D), it is possible to lower the possibility that the engagement pieces 141 is caught in the end faces 122a of the engagement grooves 122 facing the engagement pieces 141.

While the embodiments of the present invention are described above, the present invention is not limited to the embodiments and can be modified and improved in various forms. For example, at least some of the embodiments may be combined.

REFERENCE SIGNS LIST

1: ball screw device
2: screw shaft
3: ball
4: nut
5: dust-proof member
6: concave portion
7: locking portion
8: engagement piece
8a: inclined face
9: arm portion
12: inner groove portion (locking portion)
13: cutout portion
O: central axis of screw shaft, nut, and dust-proof member
101: ball screw device
110: screw shaft
111: ball rolling groove
112: flange
120: nut
121: ball rolling groove
122: engagement groove
130: ball
140: dust-proof member
141: engagement piece
142: groove portion
145: tool
200: dust-proof member extracting tool
210: first member
220: second member

The invention claimed is:
1. A dust-proof member extracting tool having a cylindrical shape for extracting a dust-proof member of a ball screw device including a screw shaft, a nut disposed on an outer circumference of the screw shaft and having an engagement groove formed in a circumferential direction on the inner circumferential surface thereof with a predetermined distance from an end in an axis direction, a plurality of balls disposed between a spiral ball rolling groove formed on the outer circumferential surface of the screw shaft and a spiral ball rolling groove formed on the inner circumferential surface of the nut, and the dust-proof member having a cylindrical shape, having an engagement piece engaging with the engagement groove by elastic deformation formed on the outer circumferential surface thereof, being attached to the nut, and having one or more groove portions disposed in the axis direction on the outer circumferential surface, the dust-proof member extracting tool comprising:
- a first member which has an arc-like cross-sectional shape having a cutout larger than the diameter of the screw shaft and in which a plurality of protrusions for pressing an inner wall of one of the one or more groove portions to the central axis to disengage the engagement piece from the engagement groove are disposed in an end portion to protrude in the axis direction; and
- a second member having an arc-like cross-sectional shape and being detachably attached to the first member in the circumferential direction to form the cylindrical shape.

2. The dust-proof member extracting tool according to claim 1, wherein an end portion of the second member is provided with one or more of the protrusions for pressing the inner wall of the groove portion to the central axis to disengage the engagement piece from the engagement groove to protrude in the axis direction.

3. The dust-proof member extracting tool according to claim 2, wherein the protrusions are disposed at regular intervals in the circumferential direction.

4. The dust-proof member extracting tool according to claim 1, wherein the protrusions are disposed at regular intervals in the circumferential direction.

* * * * *